United States Patent [19]

Matsuoka et al.

[11] Patent Number: 5,819,242
[45] Date of Patent: Oct. 6, 1998

[54] FUZZY-NEURAL NETWORK SYSTEM AND A LEARNING METHOD THEREIN

[75] Inventors: Teruhiko Matsuoka, Chiba; Takashi Aramaki, Ichihara, both of Japan

[73] Assignee: Sharp Kabushiki Kaisha, Osaka, Japan

[21] Appl. No.: 620,998

[22] Filed: Mar. 22, 1996

[30] Foreign Application Priority Data

May 16, 1995 [JP] Japan .................................. 7-117218

[51] Int. Cl.$^6$ .............................. G06F 15/18; G06F 9/44
[52] U.S. Cl. ................................................. 706/2; 706/16
[58] Field of Search ................................ 395/22, 3, 900, 395/11, 61, 51; 706/16, 2

[56] References Cited

U.S. PATENT DOCUMENTS

| | | | |
|---|---|---|---|
| 5,402,519 | 3/1995 | Inoue et al. | 706/16 |
| 5,416,888 | 5/1995 | Shimokawa | 395/22 |
| 5,448,681 | 9/1995 | Khan . | |
| 5,524,176 | 6/1996 | Narita et al. | 395/22 |
| 5,579,439 | 11/1996 | Khan | 395/3 |
| 5,606,646 | 2/1997 | Khan et al. | 395/24 |

FOREIGN PATENT DOCUMENTS

| | | |
|---|---|---|
| 0471857A1 | 2/1992 | European Pat. Off. . |
| Hei 5 224939 | 9/1993 | Japan . |
| Hei 8 44569 | 2/1996 | Japan . |
| WO 94/22074 | 9/1994 | WIPO . |

OTHER PUBLICATIONS

Chin–Teng Lin, et al.; "Neural–Network–Based Fuzzy Logic Control and Decision System"; IEEE Transactions on Computers, 40(1991)Dec., No. 1, New York; pp. 1320–1336.

Chi–Hsu Wang, et al.; "Fuzzy B–Spline Membership Function (BMF) and Its Applications in Fuzzy Neural Control", IEEE Transactions on Systems, Man, and Cybernetics, 25(1995) May, No. 5, New York; pp. 841–851.

Okada, Hiroyuki, et al.; "Initializing Multilayer Neural Networks with Fuzzy Logic"; IJCNN International Joint Conference on Neural Networks, Jun. 7–Nov. 1992, Baltimore, MD, vol. 1, pp. 239–144.

Chan et al, "Fuzzy Neural Logic Network and its Learning Algorithms", IEEE 1991 Annual Hawaii International Conference on System Sciences.

Sun et al, "Fuzzy Modeling Based on Generalized Neural Networks and Fuzzy Clustering Objective Functions" Proceedings on the 30th Conf. on Decision and Control, IEEE 1991.

Horikawa et al, "On Identification of Structures in Premises of a Fuzzy Model Using a Fuzzy Neural Networks", International Conference on Fuzzy Systems, IEEE 1993.

(List continued on next page.)

*Primary Examiner*—George B. Davis
*Attorney, Agent, or Firm*—David G. Conlin; Brian L. Michaelis

[57] ABSTRACT

A fuzzy-neural network system includes: an input layer outputting values of input parameters; a membership layer wherein a multiple number of regions for each of the input parameters are formed by dividing the probable range of the input parameter and a membership function is defined for each of the regions, the membership layer producing membership values as to the regions for each of the input parameters, in accordance with the output values from the input layer; a rule layer wherein specific rules are formed between regions belonging to different input parameters, the rule layer outputting a suitability for each of the rules; an outputting layer producing an output parameter or parameters in accordance with the output values from the rule layer; and a membership value setup means which, if some of the input parameters are unknown, sets up prescribed values as membership values corresponding to the unknown parameters.

8 Claims, 19 Drawing Sheets

OTHER PUBLICATIONS

Nishina et al, "Fuzzy Inference Neural Networks Which Automatically Partition a Pattern Space and Extract Fuzzy If–Then Rules", Inter. Conf. on Fuzzy Systems, IEEE 1994.

Mitra et al, "Fuzzy Multi–Layer Perceptron, Inferencing and Rule Generation", IEEE Transactions on Neural Networks, Jan. 1995.

N.K. Kasabov "Learning Fuzzy Rules Through Neural Networks", Inter. Two–Stream Conf. on Artificial Neural Networks, IEEE 1993.

Enbustu, et al, "Fuzzy Rule Exraction from a Multilayered Neural Network", IEEE Inter. Conference on Neural Networks, 1991.

Ishigami et al, "Automatic Generation of Hierarchical Structure of Fuzzy Inference by Genetic Algorithm", IEEE Inter. Conference on Neural Network, 1994.

MEMBERSHIP FUNCTION FOR BIG

MEMBERSHIP FUNCTION FOR MIDDLE

MEMBERSHIP FUNCTION FOR SMALL (a) FUNCTION REPRESENTED BY x1 and x2

(b) FUNCTION REPRESENTED BY x2 and x3

(c) FUNCTION REPRESENTED BY x1 and x3

FIG. 12

| DATA NO. | x1 | x2 | x3 | y1 |
|---|---|---|---|---|
| 1 | 0.0 | 0.0 | 0.0 | -0.095 |
| 2 | 0.0 | 0.0 | 0.5 | 0.035 |
| 3 | 0.0 | 0.0 | 1.0 | 0.301 |
| 4 | 0.0 | 0.5 | 0.0 | 0.035 |
| 5 | 0.0 | 0.5 | 0.5 | 0.248 |
| 6 | 0.0 | 0.5 | 1.0 | 0.500 |
| 7 | 0.0 | 1.0 | 0.0 | 0.301 |
| 8 | 0.0 | 1.0 | 0.5 | 0.500 |
| 9 | 0.0 | 1.0 | 1.0 | 0.698 |
| 10 | 0.5 | 0.0 | 0.0 | 0.035 |
| 11 | 0.5 | 0.0 | 0.5 | 0.248 |
| 12 | 0.5 | 0.0 | 1.0 | 0.500 |
| 13 | 0.5 | 0.5 | 0.0 | 0.248 |
| 14 | 0.5 | 0.5 | 0.5 | 0.501 |
| 15 | 0.5 | 0.5 | 1.0 | 0.753 |
| 16 | 0.5 | 1.0 | 0.0 | 0.500 |
| 17 | 0.5 | 1.0 | 0.5 | 0.753 |
| 18 | 0.5 | 1.0 | 1.0 | 0.965 |
| 19 | 1.0 | 0.0 | 0.0 | 0.301 |
| 20 | 1.0 | 0.0 | 0.5 | 0.500 |
| 21 | 1.0 | 0.0 | 1.0 | 0.698 |
| 22 | 1.0 | 0.5 | 0.0 | 0.500 |
| 23 | 1.0 | 0.5 | 0.5 | 0.753 |
| 24 | 1.0 | 0.5 | 1.0 | 0.965 |
| 25 | 1.0 | 1.0 | 0.0 | 0.698 |
| 26 | 1.0 | 1.0 | 0.5 | 0.965 |
| 27 | 1.0 | 1.0 | 1.0 | 1.096 |

FIG. 13

| DATA NO. | x1 | x2 | x3 | y1' | y1-y1' |
|---|---|---|---|---|---|
| 1 | 1.0 | 0.0 | 0.0 | -0.173 | 0.078 |
| 2 | 0.0 | 0.0 | 0.5 | 0.015 | 0.020 |
| 3 | 0.0 | 0.0 | 1.0 | 0.283 | 0.018 |
| 4 | 0.0 | 0.5 | 0.0 | 0.015 | 0.020 |
| 5 | 0.0 | 0.5 | 0.5 | 0.253 | -0.005 |
| 6 | 0.0 | 0.5 | 1.0 | 0.504 | -0.004 |
| 7 | 0.0 | 1.0 | 0.0 | 0.283 | 0.018 |
| 8 | 0.0 | 1.0 | 0.5 | 0.504 | -0.004 |
| 9 | 0.0 | 1.0 | 1.0 | 0.703 | 0.005 |
| 10 | 0.5 | 0.0 | 0.0 | -0.005 | 0.040 |
| 11 | 0.5 | 0.0 | 0.5 | 0.244 | 0.004 |
| 12 | 0.5 | 0.0 | 1.0 | 0.497 | 0.003 |
| 13 | 0.5 | 0.5 | 0.0 | 0.244 | 0.004 |
| 14 | 0.5 | 0.5 | 0.5 | 0.502 | 0.001 |
| 15 | 0.5 | 0.5 | 1.0 | 0.753 | 0.000 |
| 16 | 0.5 | 1.0 | 0.0 | 0.497 | 0.003 |
| 17 | 0.5 | 1.0 | 0.5 | 0.753 | 0.000 |
| 18 | 0.5 | 1.0 | 1.0 | 0.966 | -0.001 |
| 19 | 1.0 | 0.0 | 0.0 | 0.264 | 0.037 |
| 20 | 1.0 | 0.0 | 0.5 | 0.498 | 0.002 |
| 21 | 1.0 | 0.0 | 1.0 | 0.697 | 0.001 |
| 22 | 1.0 | 0.5 | 0.0 | 0.498 | 0.002 |
| 23 | 1.0 | 0.5 | 0.5 | 0.754 | -0.001 |
| 24 | 1.0 | 0.5 | 1.0 | 0.966 | -0.001 |
| 25 | 1.0 | 1.0 | 0.0 | 0.697 | 0.001 |
| 26 | 1.0 | 1.0 | 0.5 | 0.966 | -0.001 |
| 27 | 1.0 | 1.0 | 1.0 | 1.096 | 0.000 |

FIG. 14

| DATA NO. | TOOTH-LESS 2 | TOOTH-LESS 3 | TOOTH-LESS 4 | TOOTH-LESS 5 | TOOTH-LESS 6 | TOOTH-LESS 7 | TOOTH-LESS 8 | TOOTH-LESS 9 |
|---|---|---|---|---|---|---|---|---|
| 1 | 0.082 | 0.082 | -0.019 | -0.021 | -0.010 | -0.011 | -0.014 | -0.042 |
| 2 | 0.019 | 0.035 | 0.013 | 0.017 | 0.120 | -0.011 | -0.014 | -0.039 |
| 3 | 0.017 | 0.050 | -0.018 | -0.021 | 0.030 | 0.112 | 0.109 | 0.354 |
| 4 | 0.035 | 0.019 | 0.004 | 0.004 | -0.001 | 0.003 | -0.007 | 0.008 |
| 5 | 0.008 | 0.008 | -0.006 | 0.052 | 0.004 | 0.002 | -0.005 | 0.010 |
| 6 | 0.008 | 0.004 | 0.005 | 0.005 | 0.015 | -0.007 | 0.050 | -0.006 |
| 7 | 0.050 | 0.017 | 0.004 | 0.022 | -0.002 | 0.003 | 0.010 | 0.008 |
| 8 | 0.004 | 0.008 | -0.006 | 0.070 | 0.004 | 0.003 | 0.010 | 0.011 |
| 9 | 0.003 | 0.003 | 0.005 | 0.022 | 0.015 | -0.010 | 0.065 | -0.006 |
| 10 | 0.021 | 0.021 | 0.002 | 0.008 | 0.001 | -0.007 | 0.004 | 0.009 |
| 11 | -0.005 | -0.009 | 0.044 | -0.023 | -0.014 | -0.005 | 0.003 | 0.007 |
| 12 | -0.004 | 0.007 | 0.003 | 0.009 | 0.018 | 0.059 | -0.011 | -0.006 |
| 13 | -0.009 | -0.005 | -0.003 | -0.005 | 0.000 | -0.005 | -0.004 | -0.003 |
| 14 | 0.000 | 0.000 | 0.018 | 0.023 | 0.002 | -0.003 | -0.003 | -0.003 |
| 15 | 0.001 | -0.002 | -0.002 | -0.003 | -0.005 | 0.029 | 0.029 | 0.003 |
| 16 | 0.007 | -0.004 | -0.003 | -0.007 | 0.001 | -0.004 | -0.005 | -0.002 |
| 17 | -0.002 | 0.001 | 0.020 | 0.020 | 0.003 | -0.002 | -0.005 | -0.002 |
| 18 | -0.002 | -0.002 | -0.003 | -0.008 | -0.006 | 0.030 | 0.025 | 0.003 |
| 19 | 0.020 | 0.020 | 0.020 | 0.008 | 0.001 | -0.004 | 0.005 | 0.009 |
| 20 | -0.004 | -0.010 | 0.062 | -0.024 | -0.015 | -0.003 | 0.004 | 0.008 |
| 21 | -0.005 | 0.006 | 0.020 | 0.010 | 0.018 | 0.059 | -0.013 | -0.006 |
| 22 | -0.010 | -0.004 | -0.005 | -0.005 | 0.001 | -0.003 | -0.003 | -0.002 |
| 23 | 0.001 | 0.001 | 0.015 | 0.025 | 0.003 | -0.003 | -0.002 | -0.002 |
| 24 | 0.000 | -0.002 | -0.006 | -0.005 | -0.006 | 0.028 | 0.029 | 0.003 |
| 25 | 0.006 | -0.005 | -0.007 | -0.009 | 0.000 | -0.004 | -0.006 | -0.003 |
| 26 | -0.002 | 0.000 | 0.014 | 0.019 | 0.003 | -0.004 | -0.006 | -0.003 |
| 27 | -0.001 | -0.001 | -0.006 | -0.008 | -0.006 | 0.027 | 0.024 | 0.004 |

FIG. 15

| I/O ITEM NO. | SPEC. MIN | SPEC. MAX | I/O ITEMS |
|---|---|---|---|
| i1 | 55.0 | 70.0 | GLASS TRANSITION POINT |
| i2 | 1.0 | 40.0 | MELT INDEX |
| i3 | 2000.0 | 8000.0 | PEAK MOLECULAR WEIGHT OF LOW WEIGHT-MOLECULE |
| i4 | 100000.0 | 2000000.0 | PEAK MOLECULAR WEIGHT OF HIGH WEIGHT-MOLECULE |
| i5 | 20.0 | 80.0 | HIGH WEIGHT-MOLECULE RATIO |
| i6 | 30000.0 | 120000.0 | G' |
| i7 | 30000.0 | 90000.0 | G'' |
| i8 | 3000.0 | 7000.0 | VISCOSITY |
| i9 | 0.0 | 30.0 | ACRYLIC RATIO |
| o1 | 40.0 | 65.0 | FIXING STRENGTH |

FIG. 16

|   | i1 | i2 | i3 | i4 | i5 | i6 | i7 | i8 | i9 | o1 |
|---|---|---|---|---|---|---|---|---|---|---|
| 1 | 65.5 | 12.0 | 4200.0 | 180000 | 50.0 | 36000 | 46000 | 6100.0 | 10.0 | 53.2 |
| 2 | 64.1 | 6.5 | 3900.0 | 130000 | 50.0 | 51000 | 41000 | 4500.0 | 18.0 | 46.2 |
| 3 | 63.9 | 8.1 | 4200.0 | 250000 | 50.0 | 43000 | 48000 | 4200.0 | 18.0 | 46.7 |
| 4 | 62.4 | 8.0 | 4100.0 | 200000 | 50.0 | 56000 | 46000 | 5000.0 | 20.0 | 50.0 |
| 5 | 65.2 | 10.0 | 4100.0 | 204000 | 45.0 | 38000 | 82000 | 3900.0 | 16.0 | 48.1 |
| 6 | 66.2 | 13.0 | 4200.0 | 202000 | 43.0 | 33000 | 43000 | 3700.0 | 14.0 | 47.4 |
| 7 | 66.0 | 4.3 | 4000.0 | 400000 | 40.0 | 58000 | 51000 | 4000.0 | 14.0 | 47.7 |
| 8 | 65.2 | 4.4 | 4000.0 | 470000 | 40.0 | 58000 | 51000 | 4000.0 | 14.0 | 59.4 |

FIG. 17

|   | i1 | i2 | i3 | i4 | i5 | i6 | i7 | i8 | i9 | o1 |
|---|---|---|---|---|---|---|---|---|---|---|
| 1 | 1.0 | 12.0 | 4200.0 | 180000 | 50.0 | 36000 | 46000 | 6100.0 | 10.0 | 53.2 |
| 2 | 64.1 | 6.5 | 3900.0 | 130000 | 50.0 | 51000 | 41000 | 4500.0 | 18.0 | 46.2 |
| 3 | 63.9 | 8.1 | 4200.0 | 250000 | 50.0 | 43000 | 48000 | 4200.0 | 18.0 | 46.7 |
| 4 | 62.4 | 8.0 | 4100.0 | 200000 | 1.0 | 56000 | 46000 | 5000.0 | 20.0 | 50.0 |
| 5 | 65.2 | 10.0 | 4100.0 | 204000 | 45.0 | 38000 | 82000 | 3900.0 | 16.0 | 48.1 |
| 6 | 66.2 | 13.0 | 4200.0 | 202000 | 43.0 | 33000 | 43000 | 3700.0 | 14.0 | 47.4 |
| 7 | 66.0 | 4.3 | 4000.0 | 400000 | 40.0 | 58000 | 51000 | 4000.0 | 1.0 | 47.7 |
| 8 | 65.2 | 4.4 | 4000.0 | 470000 | 40.0 | 58000 | 51000 | 4000.0 | 14.0 | 59.4 |

FIG. 18

|   | i1   | i2  | i3     | i4     | i5   | i6     | i7    | i8     | i9   | o1   |
|---|------|-----|--------|--------|------|--------|-------|--------|------|------|
| 1 | 67.2 | 6.0 | 3700.0 | 170000 | 50.0 | 59000  | 70000 | 5400.0 | 16.0 | 50.2 |
| 2 | 62.5 | 5.0 | 4000.0 | 204000 | 50.0 | 34000  | 58000 | 3200.0 | 12.0 | 46.8 |
| 3 | 66.0 | 4.5 | 4200.0 | 460000 | 40.0 | 61000  | 51000 | 3800.0 | 14.0 | 56.2 |
| 4 | 65.7 | 1.6 | 4000.0 | 670000 | 45.0 | 110000 | 61000 | 3700.0 | 12.0 | 48.1 |
| 5 | 64.5 | 4.3 | 4000.0 | 810000 | 37.0 | 87000  | 61000 | 4000.0 | 12.0 | 60.5 |
| 6 | 64.8 | 6.0 | 4000.0 | 560000 | 65.0 | 50000  | 40000 | 3100.0 | 11.0 | 55.1 |

FIG. 19

OUTPUT RESULT BASED ON DATA SET FOR VERIFICATION

|   | i1   | i2  | i3     | i4     | i5   | i6     | i7    | i8     | i9   | o1   |
|---|------|-----|--------|--------|------|--------|-------|--------|------|------|
| 1 | 67.2 | 6.0 | 3700.0 | 170000 | 50.0 | 59000  | 70000 | 5400.0 | 16.0 | 50.1 |
| 2 | 62.5 | 5.0 | 4000.0 | 204000 | 50.0 | 34000  | 58000 | 3200.0 | 12.0 | 51.8 |
| 3 | 66.0 | 4.5 | 4200.0 | 460000 | 40.0 | 61000  | 51000 | 3800.0 | 14.0 | 53.0 |
| 4 | 65.7 | 1.6 | 4000.0 | 670000 | 45.0 | 110000 | 61000 | 3700.0 | 12.0 | 50.1 |
| 5 | 64.5 | 4.3 | 4000.0 | 810000 | 37.0 | 87000  | 61000 | 4000.0 | 12.0 | 55.9 |
| 6 | 64.8 | 6.0 | 4000.0 | 560000 | 65.0 | 50000  | 40000 | 3100.0 | 11.0 | 49.7 |

ERROR OF VERIFICATION DATA SET FROM TEACHER DATA

| SUM OF ERRORS | MEAN ERROR | SQUARE ERROR |
|---------------|------------|--------------|
| 0.847         | 0.141      | 0.025        |

FIG. 20

OUTPUT RESULT BASED ON DATA SET FOR VERIFICATION

|   | i1   | i2  | i3     | i4     | i5   | i6     | i7    | i8     | i9   | o1   |
|---|------|-----|--------|--------|------|--------|-------|--------|------|------|
| 1 | 67.2 | 6.0 | 3700.0 | 170000 | 50.0 | 59000  | 70000 | 5400.0 | 16.0 | 50.5 |
| 2 | 62.5 | 5.0 | 4000.0 | 204000 | 50.0 | 34000  | 58000 | 3200.0 | 12.0 | 52.3 |
| 3 | 66.0 | 4.5 | 4200.0 | 460000 | 40.0 | 61000  | 51000 | 3800.0 | 14.0 | 53.9 |
| 4 | 65.7 | 1.6 | 4000.0 | 670000 | 45.0 | 110000 | 61000 | 3700.0 | 12.0 | 51.4 |
| 5 | 64.5 | 4.3 | 4000.0 | 810000 | 37.0 | 87000  | 61000 | 4000.0 | 12.0 | 55.9 |
| 6 | 64.8 | 6.0 | 4000.0 | 560000 | 65.0 | 50000  | 40000 | 3100.0 | 11.0 | 49.3 |

ERROR OF VERIFICATION DATA SET FROM TEACHER DATA

| SUM OF ERRORS | MEAN ERROR | SQUARE ERROR |
|---------------|------------|--------------|
| 0.871         | 0.145      | 0.027        |

FIG.21

|   | i1   | i2   | i3     | i4     | i5   | i6     | i7    | i8     | i9   | o1   |
|---|------|------|--------|--------|------|--------|-------|--------|------|------|
| 1 | 65.5 | 12.0 | 4200.0 | 180000 | 50.0 | 36000  | 46000 | 6100.0 | 10.0 | 53.2 |
| 2 | 64.1 | 6.5  | 3900.0 | 130000 | 50.0 | 51000  | 41000 | 4500.0 | 18.0 | 46.2 |
| 3 | 63.9 | 8.1  | 4200.0 | 250000 | 50.0 | 43000  | 48000 | 4200.0 | 18.0 | 46.7 |
| 4 | 62.4 | 8.0  | 4100.0 | 200000 | 50.0 | 56000  | 46000 | 5000.0 | 20.0 | 50.0 |
| 5 | 65.2 | 10.0 | 4100.0 | 204000 | 45.0 | 38000  | 82000 | 3900.0 | 16.0 | 48.1 |
| 6 | 66.2 | 13.0 | 4200.0 | 202000 | 43.0 | 33000  | 43000 | 3700.0 | 14.0 | 47.4 |
| 7 | 66.0 | 4.3  | 4000.0 | 400000 | 40.0 | 58000  | 51000 | 4000.0 | 14.0 | 47.7 |
| 8 | 65.2 | 4.4  | 4000.0 | 470000 | 40.0 | 58000  | 51000 | 4000.0 | 14.0 | 59.4 |
| 9 | 64.5 | 3.3  | 4000.0 | 610000 | 40.0 | 79000  | 58000 | 3600.0 | 12.0 | 58.3 |
| 10 | 65.7 | 2.1 | 4000.0 | 680000 | 45.0 | 110000 | 61000 | 3700.0 | 12.0 | 49.1 |
| 11 | 65.0 | 1.9 | 4000.0 | 650000 | 45.0 | 110000 | 61000 | 3700.0 | 12.0 | 55.6 |
| 12 | 64.3 | 2.8 | 4000.0 | 810000 | 39.0 | 87000  | 61000 | 4000.0 | 12.0 | 59.0 |
| 13 | 64.8 | 6.0 | 4000.0 | 560000 | 35.0 | 50000  | 40000 | 3100.0 | 11.0 | 63.1 |

FIG.22

|   | i1   | i2   | i3     | i4     | i5   | i6     | i7    | i8     | i9   | o1   |
|---|------|------|--------|--------|------|--------|-------|--------|------|------|
| 1 | 1.0  | 12.0 | 4200.0 | 180000 | 50.0 | 36000  | 46000 | 6100.0 | 10.0 | 53.2 |
| 2 | 64.1 | 6.5  | 3900.0 | 130000 | 50.0 | 51000  | 41000 | 4500.0 | 18.0 | 46.2 |
| 3 | 63.9 | 8.1  | 4200.0 | 250000 | 50.0 | 43000  | 48000 | 4200.0 | 18.0 | 46.7 |
| 4 | 62.4 | 8.0  | 4100.0 | 200000 | 1.0  | 56000  | 46000 | 5000.0 | 20.0 | 50.0 |
| 5 | 65.2 | 10.0 | 4100.0 | 204000 | 45.0 | 38000  | 82000 | 3900.0 | 16.0 | 48.1 |
| 6 | 66.2 | 13.0 | 4200.0 | 202000 | 43.0 | 33000  | 43000 | 3700.0 | 14.0 | 47.4 |
| 7 | 66.0 | 4.3  | 4000.0 | 400000 | 40.0 | 58000  | 51000 | 4000.0 | 1.0  | 47.7 |
| 8 | 65.2 | 4.4  | 4000.0 | 470000 | 40.0 | 58000  | 51000 | 4000.0 | 14.0 | 59.4 |
| 9 | 64.5 | 3.3  | 4000.0 | 610000 | 40.0 | 79000  | 58000 | 3600.0 | 12.0 | 58.3 |
| 10 | 65.7 | 2.1 | 4000.0 | 680000 | 45.0 | 110000 | 61000 | 3700.0 | 12.0 | 49.1 |
| 11 | 65.0 | 1.9 | 4000.0 | 650000 | 45.0 | 110000 | 61000 | 3700.0 | 12.0 | 55.6 |
| 12 | 64.3 | 2.8 | 4000.0 | 810000 | 39.0 | 87000  | 61000 | 4000.0 | 12.0 | 59.0 |
| 13 | 64.8 | 6.0 | 4000.0 | 560000 | 35.0 | 50000  | 40000 | 3100.0 | 11.0 | 63.1 |

FIG.23

|  | i1 | i2 | i3 | i4 | i5 | i6 | i7 | i8 | i9 | o1 |
|---|---|---|---|---|---|---|---|---|---|---|
| 1 | 65.5 | 12.0 | 4200.0 | 180000 | 50.0 | 36000 | 46000 | 6100.0 | 10.0 | 53.2 |
| 2 | 64.1 | 6.5 | 3900.0 | 130000 | 50.0 | 51000 | 41000 | 4500.0 | 18.0 | 46.2 |
| 3 | 63.9 | 8.1 | 4200.0 | 250000 | 50.0 | 43000 | 48000 | 4200.0 | 18.0 | 46.7 |
| 4 | 62.4 | 8.0 | 4100.0 | 200000 | 50.0 | 56000 | 46000 | 5000.0 | 20.0 | 50.0 |
| 5 | 65.2 | 10.0 | 4100.0 | 204000 | 45.0 | 38000 | 82000 | 3900.0 | 16.0 | 48.1 |
| 6 | 66.2 | 13.0 | 4200.0 | 202000 | 43.0 | 33000 | 43000 | 3700.0 | 14.0 | 47.4 |
| 7 | 66.0 | 4.3 | 4000.0 | 400000 | 40.0 | 58000 | 51000 | 4000.0 | 14.0 | 47.7 |
| 8 | 65.2 | 4.4 | 4000.0 | 470000 | 40.0 | 58000 | 51000 | 4000.0 | 14.0 | 59.4 |
| 9 | 1.0 | 3.3 | 4000.0 | 610000 | 40.0 | 79000 | 58000 | 3600.0 | 12.0 | 58.3 |
| 10 | 65.7 | 2.1 | 1.0 | 680000 | 45.0 | 110000 | 61000 | 3700.0 | 12.0 | 49.1 |
| 11 | 65.0 | 1.9 | 4000.0 | 650000 | 1.0 | 110000 | 61000 | 3700.0 | 12.0 | 55.6 |
| 12 | 64.3 | 2.8 | 4000.0 | 810000 | 39.0 | 87000 | 1.0 | 4000.0 | 12.0 | 59.0 |
| 13 | 64.8 | 6.0 | 4000.0 | 560000 | 35.0 | 50000 | 40000 | 3100.0 | 1.0 | 63.1 |

FIG.24

|  | i1 | i2 | i3 | i4 | i5 | i6 | i7 | i8 | i9 | o1 |
|---|---|---|---|---|---|---|---|---|---|---|
| 1 | 1.0 | 12.0 | 4200.0 | 180000 | 50.0 | 36000 | 46000 | 6100.0 | 10.0 | 53.2 |
| 2 | 64.1 | 6.5 | 3900.0 | 130000 | 50.0 | 51000 | 41000 | 4500.0 | 18.0 | 46.2 |
| 3 | 63.9 | 8.1 | 4200.0 | 250000 | 50.0 | 43000 | 48000 | 4200.0 | 18.0 | 46.7 |
| 4 | 62.4 | 8.0 | 4100.0 | 200000 | 1.0 | 56000 | 46000 | 5000.0 | 20.0 | 50.0 |
| 5 | 65.2 | 10.0 | 4100.0 | 204000 | 45.0 | 38000 | 82000 | 3900.0 | 16.0 | 48.1 |
| 6 | 66.2 | 13.0 | 4200.0 | 202000 | 43.0 | 33000 | 43000 | 3700.0 | 14.0 | 47.4 |
| 7 | 66.0 | 4.3 | 4000.0 | 400000 | 40.0 | 58000 | 51000 | 4000.0 | 1.0 | 47.7 |
| 8 | 65.2 | 4.4 | 4000.0 | 470000 | 40.0 | 58000 | 51000 | 4000.0 | 14.0 | 59.4 |
| 9 | 1.0 | 3.3 | 4000.0 | 610000 | 40.0 | 79000 | 58000 | 3600.0 | 12.0 | 58.3 |
| 10 | 65.7 | 2.1 | 1.0 | 680000 | 45.0 | 110000 | 61000 | 3700.0 | 12.0 | 49.1 |
| 11 | 65.0 | 1.9 | 4000.0 | 650000 | 1.0 | 110000 | 61000 | 3700.0 | 12.0 | 55.6 |
| 12 | 64.3 | 2.8 | 4000.0 | 810000 | 39.0 | 87000 | 1.0 | 4000.0 | 12.0 | 59.0 |
| 13 | 64.8 | 6.0 | 4000.0 | 560000 | 35.0 | 50000 | 40000 | 3100.0 | 1.0 | 63.1 |

FIG. 25

OUTPUT RESULT BASED ON DATA SET FOR VERIFICATION

|   | i1   | i2  | i3     | i4     | i5   | i6     | i7    | i8     | i9   | O1   |
|---|------|-----|--------|--------|------|--------|-------|--------|------|------|
| 1 | 67.2 | 6.0 | 3700.0 | 170000 | 50.0 | 59000  | 70000 | 5400.0 | 16.0 | 45.8 |
| 2 | 62.5 | 5.0 | 4000.0 | 204000 | 50.0 | 34000  | 58000 | 3200.0 | 12.0 | 52.1 |
| 3 | 66.0 | 4.5 | 4200.0 | 460000 | 40.0 | 61000  | 51000 | 3800.0 | 14.0 | 52.6 |
| 4 | 65.7 | 1.6 | 4000.0 | 670000 | 45.0 | 110000 | 61000 | 3700.0 | 12.0 | 51.4 |
| 5 | 64.5 | 4.3 | 4000.0 | 810000 | 37.0 | 87000  | 61000 | 4000.0 | 12.0 | 60.4 |
| 6 | 64.8 | 6.0 | 4000.0 | 560000 | 65.0 | 50000  | 40000 | 3100.0 | 11.0 | 55.8 |

ERROR OF VERIFICATION DATA SET FROM TEACHER DATA

| SUM OF ERRORS | MEAN ERROR | SQUARE ERROR |
|---------------|------------|--------------|
| 0.694         | 0.116      | 0.019        |

FIG. 26

OUTPUT RESULT BASED ON DATA SET FOR VERIFICATION

|   | i1   | i2  | i3     | i4     | i5   | i6     | i7    | i8     | i9   | O1   |
|---|------|-----|--------|--------|------|--------|-------|--------|------|------|
| 1 | 67.2 | 6.0 | 3700.0 | 170000 | 50.0 | 59000  | 70000 | 5400.0 | 16.0 | 46.7 |
| 2 | 62.5 | 5.0 | 4000.0 | 204000 | 50.0 | 34000  | 58000 | 3200.0 | 12.0 | 53.3 |
| 3 | 66.0 | 4.5 | 4200.0 | 460000 | 40.0 | 61000  | 51000 | 3800.0 | 14.0 | 54.1 |
| 4 | 65.7 | 1.6 | 4000.0 | 670000 | 45.0 | 110000 | 61000 | 3700.0 | 12.0 | 51.7 |
| 5 | 64.5 | 4.3 | 4000.0 | 810000 | 37.0 | 87000  | 61000 | 4000.0 | 12.0 | 60.2 |
| 6 | 64.8 | 6.0 | 4000.0 | 560000 | 65.0 | 50000  | 40000 | 3100.0 | 11.0 | 56.4 |

ERROR OF VERIFICATION DATA SET FROM TEACHER DATA

| SUM OF ERRORS | MEAN ERROR | SQUARE ERROR |
|---------------|------------|--------------|
| 0.692         | 0.115      | 0.020        |

FIG.27

OUTPUT RESULT BASED ON DATA SET FOR VERIFICATION

|   | i1   | i2  | i3     | i4     | i5   | i6     | i7    | i8     | i9   | o1   |
|---|------|-----|--------|--------|------|--------|-------|--------|------|------|
| 1 | 67.2 | 6.0 | 3700.0 | 170000 | 50.0 | 59000  | 70000 | 5400.0 | 16.0 | 47.2 |
| 2 | 62.5 | 5.0 | 4000.0 | 204000 | 50.0 | 34000  | 58000 | 3200.0 | 12.0 | 51.4 |
| 3 | 66.0 | 4.5 | 4200.0 | 460000 | 40.0 | 61000  | 51000 | 3800.0 | 14.0 | 54.5 |
| 4 | 65.7 | 1.6 | 4000.0 | 670000 | 45.0 | 110000 | 61000 | 3700.0 | 12.0 | 51.9 |
| 5 | 64.5 | 4.3 | 4000.0 | 810000 | 37.0 | 87000  | 61000 | 4000.0 | 12.0 | 58.9 |
| 6 | 64.8 | 6.0 | 4000.0 | 560000 | 65.0 | 50000  | 40000 | 3100.0 | 11.0 | 55.8 |

ERROR OF VERIFICATION DATA SET FROM TEACHER DATA

| SUM OF ERRORS | MEAN ERROR | SQUARE ERROR |
|---------------|------------|--------------|
| 0.616         | 0.103      | 0.014        |

FIG.28

OUTPUT RESULT BASED ON DATA SET FOR VERIFICATION

|   | i1   | i2  | i3     | i4     | i5   | i6     | i7    | i8     | i9   | o1   |
|---|------|-----|--------|--------|------|--------|-------|--------|------|------|
| 1 | 67.2 | 6.0 | 3700.0 | 170000 | 50.0 | 59000  | 70000 | 5400.0 | 16.0 | 46.9 |
| 2 | 62.5 | 5.0 | 4000.0 | 204000 | 50.0 | 34000  | 58000 | 3200.0 | 12.0 | 52.0 |
| 3 | 66.0 | 4.5 | 4200.0 | 460000 | 40.0 | 61000  | 51000 | 3800.0 | 14.0 | 55.0 |
| 4 | 65.7 | 1.6 | 4000.0 | 670000 | 45.0 | 110000 | 61000 | 3700.0 | 12.0 | 52.2 |
| 5 | 64.5 | 4.3 | 4000.0 | 810000 | 37.0 | 87000  | 61000 | 4000.0 | 12.0 | 58.6 |
| 6 | 64.8 | 6.0 | 4000.0 | 560000 | 65.0 | 50000  | 40000 | 3100.0 | 11.0 | 57.0 |

ERROR OF VERIFICATION DATA SET FROM TEACHER DATA

| SUM OF ERRORS | MEAN ERROR | SQUARE ERROR |
|---------------|------------|--------------|
| 0.709         | 0.118      | 0.017        |

FUZZY-NEURAL NETWORK SYSTEM AND A LEARNING METHOD THEREIN

BACKGROUND OF THE INVENTION

(1) Field of the Invention

The present invention relates to a fuzzy-neural network system in which fuzzy modeling is constructed using neural networks and the invention also relates to a learning method used in the fuzzy-neural network system.

(2) Description of the Prior Art

A typical conventional neural-network system has a layered structure composed of an input layer I, an intermediate layer H and an output layer O, as shown in FIG. 1 and all the neurons are definitely connected between the layers to form a network. In this network structure, connection weights W between the input layer I and the intermediate layer H and connection weights V between the intermediate layer H and the output layer O can be adaptively varied so that an input/output relation of sample data represented by an input pattern PX and an output pattern PY can correctly be simulated, whereby desired functions are obtained. One of typical processing methods using such a process is called 'back-propagation algorithm'.

Referring to FIGS. 2A to 2C, consider an example of the conventional set theory. If there is an input information 'the temperature is 27° C.', for example, to the system (FIG. 2A) and ambiguous input related to human feeling such that 'the temperature is high' or 'the temperature is low' is tried to be expressed mathematically, the situation used to be represented by using binary values '0' and '1' which indicate the temperature is high when the input information is higher than a certain level while the temperature is low when the input information is lower than the level (FIG. 2B). However, there is a method of representing such an ambiguous situation using the combination of two real numbers from '0' to '1'. This mathematical method is based on the fuzzy set theory which uses membership functions. That is, for example, a condition state can be expressed by 0.78 for the degree of 'high-temperature' and 0.27 for the degree of 'low-temperature' (see FIG. 2C). The so-called fuzzy control is effected based on this theory. That is, the fuzzy control is schemed so that, based on, for example, expert knowledge represented as fuzzy rules, various input patterns are calculated on the basis of the fuzzy theory and the thus obtained output value or values are used for the control.

There is another method proposed in which fuzzy rules are fused into a neural network system. This method is called neurofuzzy system. (See, for example; Japanese Patent Application Laid-Open Hei 5 No.224,939). In this method, a network is constructed by extracting expert perceptive insight and expert knowledge obtained from experience in the forms of membership functions and fuzzy rules to formulate a fuzzy model and setting up connections between units as constituents of the network and determining the connection weights in accordance with the formulated model. This network has a structure shown in FIG. 3, for example.

In this case, fuzzy sets used for fuzzy rules are set up on the network, for all input information. In this example, in the antecedent proposition, an input value x1 is represented by three fuzzy sets: Big, Middle and Small while another input value x3 is represented by two fuzzy sets: Big and Small. The rule portion has as many units as the number of the fuzzy rules and the outputs from the antecedent proposition for fuzzy rules are connected in conformity with the fuzzy rules. In this example, there are, in total, five rules such as rule 1: 'x1 is Big and x2 is Big.' and the like. Then, the consequent proposition uses output values from the rule portion to calculate an output value, based on membership functions in the consequent proposition.

For the conventional neural network or neurofuzzy system, it is possible to determine output value or values when all the data as input parameters set up in the network is known, but it is impossible to determine the output if even one of the input parameters is unknown. This is what the conventional system suffered from. Examples of unknown input parameters include a case where some input values cannot be obtained due to defects of sensors in an air conditioner or another case where some of testing values cannot be obtained due to a lack of testing devices.

In order to deal with the above situations, there has been proposed a method in which output values can be determined from input parameters even with unknown values, by using a specific learning process. However, since this learning method as it is cannot be applied to the neurofuzzy network system in which all the units are not totally connected, it is impossible for such a system to determine its output.

SUMMARY OF THE INVENTION

It is therefore an object of the present invention to provide a fuzzy-neural network system which is able to obtain output values in response to incomplete input data in which some of input parameters are unknown, and which is able to effect learning using incomplete learning data.

A fuzzy-neural network system in accordance with a first feature of the invention, includes: an input layer outputting values of input parameters; a membership layer wherein a plurality of regions for each of the input parameters are formed by dividing the probable range of the input parameter and a membership function is defined for each of the regions, the membership layer producing membership values as to the regions for each of the input parameters, in accordance with the output values from the input layer; a rule layer wherein specific rules are formed between regions belonging to different input parameters, the rule layer outputting a suitability for each of the rules; an outputting layer producing an output parameter or parameters in accordance with the output values from the rule layer; and a membership value setup means which, if some of the input parameters are unknown, sets up prescribed values as membership values corresponding to the unknown parameters.

A fuzzy-neural network system in accordance with a second feature of the invention, is constructed such that, in the first configuration of the invention, when some of the input parameters inputted to the input layer are unknown, each output from the membership layers are assumed as a range data represented by maximum and minimum values of the range, and the maximum of the range is taken as the maximum of an output from each membership function for one of all the input parameters while the minimum of the range is taken as the minimum value of the output from the membership function for the same input parameter.

A fuzzy-neural network system in accordance with a third feature of the invention, is constructed such that, in the second configuration of the invention, the maximum and minimum values for each of the unknown values are 1.0 and 0.0, respectively.

A fuzzy-neural network system in accordance with a fourth feature of the invention, is constructed such that, in the second configuration of the invention, the maximum and minimum values of the output from the output layer is determined by the steps of: calculating a weighted average of output values outputted from each of rules between known input parameters in the rule layer and weighted by corresponding connection weights between the rule layers and the output layers; and re-calculating a weighted average by involving connection weights between each of rules containing unknown input parameters in the rule layer and the output layer.

A fuzzy-neural network system in accordance with a fifth feature of the invention, is constructed such that, in the fourth configuration of the invention, the maximum and minimum values of the output from the output layer is determined by the steps of: calculating a weighted average of output values outputted from each of rules between known input parameters in the rule layer and weighted by corresponding connection weights between the output layers; extracting a maximum or minimum value of connection weights which are for the specified rules containing unknown input parameters and greater or smaller than the current weighted average; renewing the weighted average by involving the extracted maximum or minimum value; repeating the renewal of the weighted average until the weighed average no more increases or decreases by further involvement of the extracted weights; and determining the final weighted average as the maximum or minimum of the output layer, at the time the weighted average no more increases or decreases by any involvement of weights.

A learning method used in a fuzzy-neural network system in accordance with a sixth feature of the invention: in a fuzzy-neural network system including: an input layer outputting values of input parameters; a membership layer wherein a plurality of regions for each of the input parameters are formed by dividing the probable range of the input parameter and a membership function is defined for each of the regions, the membership layer producing membership values as to the regions for each of the input parameters, in accordance with the output values from the input layer; a rule layer wherein specific rules are formed between regions belonging to different input parameters, the rule layer outputting a suitability for each of the rules; an outputting layer producing an output parameter or parameters in accordance with the output values from the rule layer; and a membership value setup means which, if some of the input parameters are unknown, sets up prescribed values as membership values corresponding to the unknown parameters, the leaning method is constructed such that, depending upon whether the input parameters relating to weights to be modified at the learning mode are known or not, one of different leaning procedures is selectively used.

A learning method used in a fuzzy-neural network system in accordance with a seventh feature of the invention is constructed such that, at the modifying step of weights from the rule layer to the output layer in the sixth configuration of the invention, weights for the prescribed rules between known input parameters are modified by using both the maximum and minimum of the output from the rule layer and weights for the prescribed rules involving unknown input parameters are modified by using one of the maximum and minimum from the output from the rule layer.

A learning method used in a fuzzy-neural network system in accordance with an eighth feature of the invention is constructed such that, at the modifying step of weights for constructing membership functions for all the input parameters from the input layer to the membership layer in the sixth configuration of the invention, the modification of weights are carried out by adjusting only the weight for constructing membership functions for known input parameters.

In the present invention, the input and output relation as to a target is configured by formulating a fuzzy model which is composed of fuzzy rules containing antecedent and consequent propositions for fuzzy sets and by extracting the fuzzy rules in the forms of membership functions defined for numerating the rules. Apart from the fuzzy model, a network is configured based on the number of input and output parameters. The fuzzy-neural network of the invention is constructed on the basis of the above network so that connection weights are determined based on the fuzzy model. In such a configuration, data to be inputted is divided into two parts and therefore the output data is also outputted as two divided parts.

The divided two values are made to represent a range of each of the input parameters or to set up maximum and minimum values, respectively. When a known value is inputted, the input layer is adapted to set up the known value as the maximum and minimum. In one word, the maximum and minimum are made equal. When an unknown value is inputted, the membership value setup means is adapted to set up maximum and minimum values as the output of the membership layer, within the probable range of the membership function in question. In this case, the calculations from the input layer to the membership layer rear-half portion are defaulted.

In the operations from the rule layer to the output layer, the output values from the rules (AND rules) involving unknown input parameters are not always used for the calculative operation but used selectively. As to the learning mode, not all the weights are modified but only the selected weights are modified.

In this way, in accordance with the invention, even if the input data contains unknown values, the data is manipulatively divided into two values, whereby it becomes possible to substitute the unknown data with definite data. Since the output data from each layer has maximum and minimum values and the network itself has a significant structure, it is possible to determine the output based on the significance of the network structure, without needing unnecessary calculations. Therefore, the amount of calculations can be also reduced. Since unknown input data is relatively unreliable as compared to known input data, weights relating to the unknown input parameters are modified in the reduced amount or unmodified.

BRIEF DESCRIPTION OF THE DRAWINGS

FIG. 12 is a table showing output values from a system when sample data free from unknown values is inputted;

FIG. 13 is a table showing output values from a system and their errors when toothless sample data 1 containing unknown values is inputted;

FIG. 14 is a table showing each error when toothless sample data 2 to 9 containing unknown values is inputted;

FIG. 15 is a chart for explaining the content of toner-fixing strength analysis data;

FIG. 16 is a chart showing a learning data set (a) for toner-fixing strength analysis data with no unknown value;

FIG. 17 is a chart showing a learning data set (b) for toner-fixing strength analysis data with unknown values;

FIG. 18 is a chart showing a verification data set for toner-fixing strength analysis data;

FIG. 19 is a chart showing a verified result obtained from a system educated by the learning data set (a);

FIG. 20 is a chart showing a verified result obtained from a system educated by the learning data set (b);

FIG. 21 is a chart showing a learning data set (c) for toner-fixing strength analysis data with no unknown value;

FIG. 22 is a chart showing a learning data set (d) for toner-fixing strength analysis data with unknown values;

FIG. 23 is a chart showing a learning data set (e) for toner-fixing strength analysis data with unknown values;

FIG. 24 is a chart showing a learning data set (f) for toner-fixing strength analysis data with unknown values;

FIG. 25 is a chart showing a verified result obtained from a system educated by the learning data set (c);

FIG. 26 is a chart showing a verified result obtained from a system educated by the learning data set (d);

FIG. 27 is a chart showing a verified result obtained from a system educated by the learning data set (e); and FIG. 28 is a chart showing a verified result obtained from a system educated by the learning data set (f).

DESCRIPTION OF THE PREFERRED EMBODIMENTS

Figure 1:
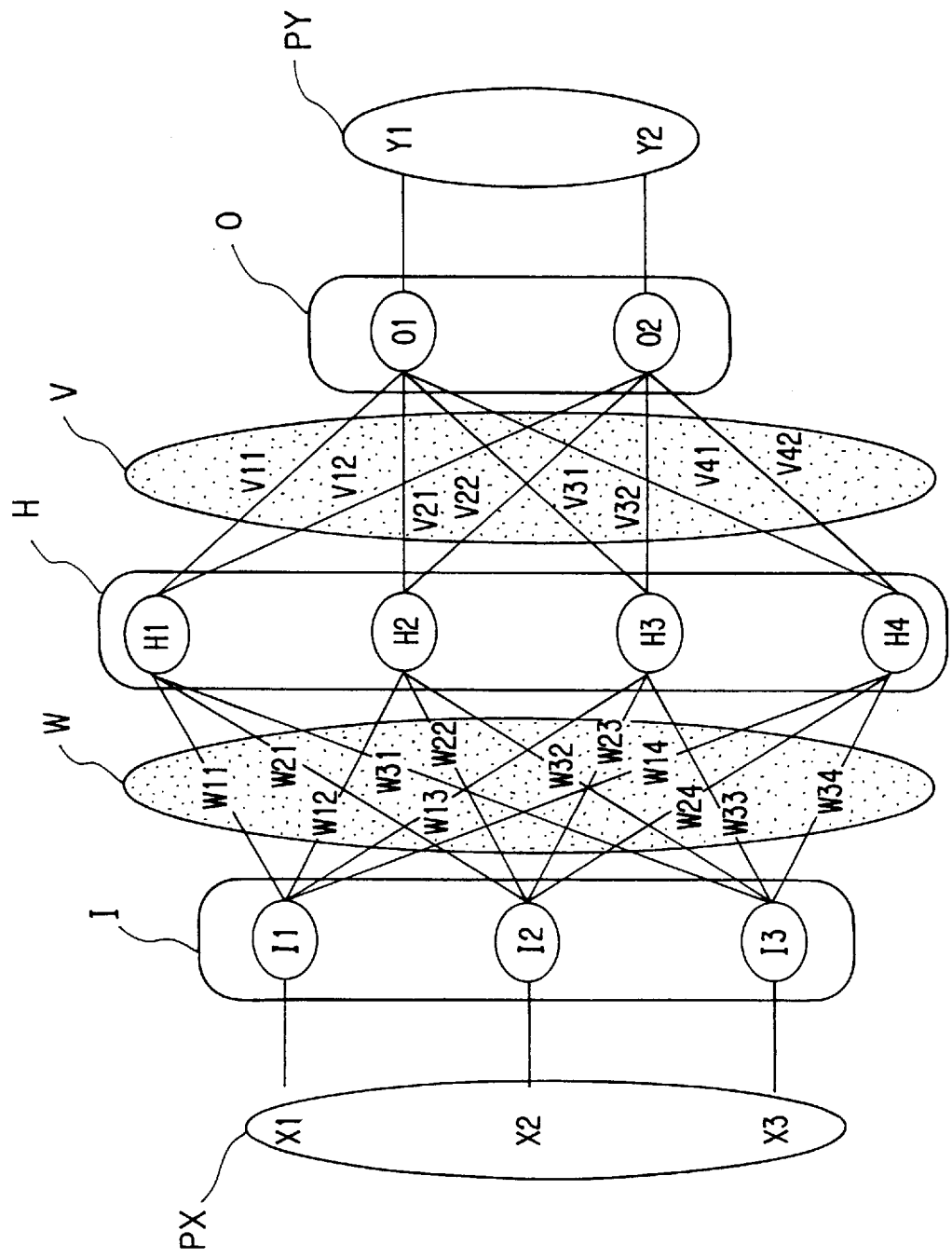
FIG. 1 is a configurational diagram showing an example of prior art neural network.
Figure 2A:
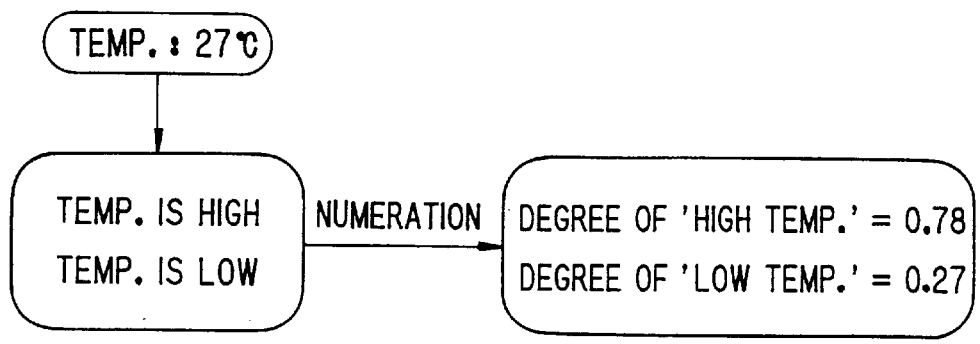
FIG. 2A is an illustrative view for explaining a numeration process of representing ambiguous human feeling.
Figure 2B:
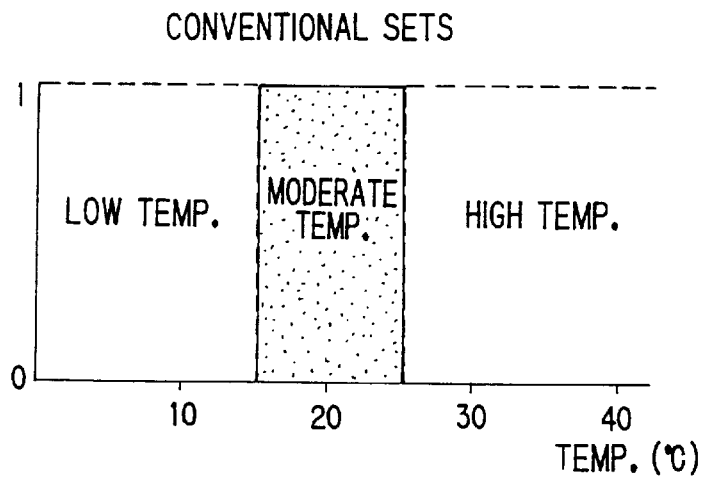
FIG. 2B is an illustrative view showing a representation of human feelings based on the conventional set-theory.
Figure 2C:
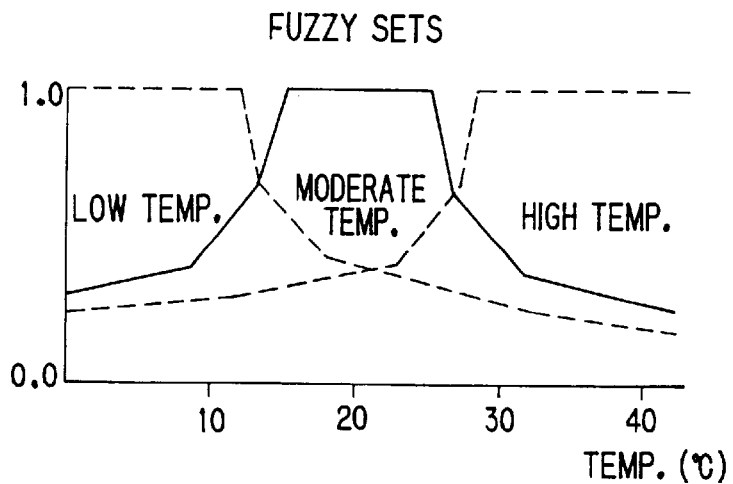
FIG. 2C is an illustrative view showing a representation of human feelings using membership functions based the fuzzy set theory in order to explain the fuzzy theory.
Figure 3:
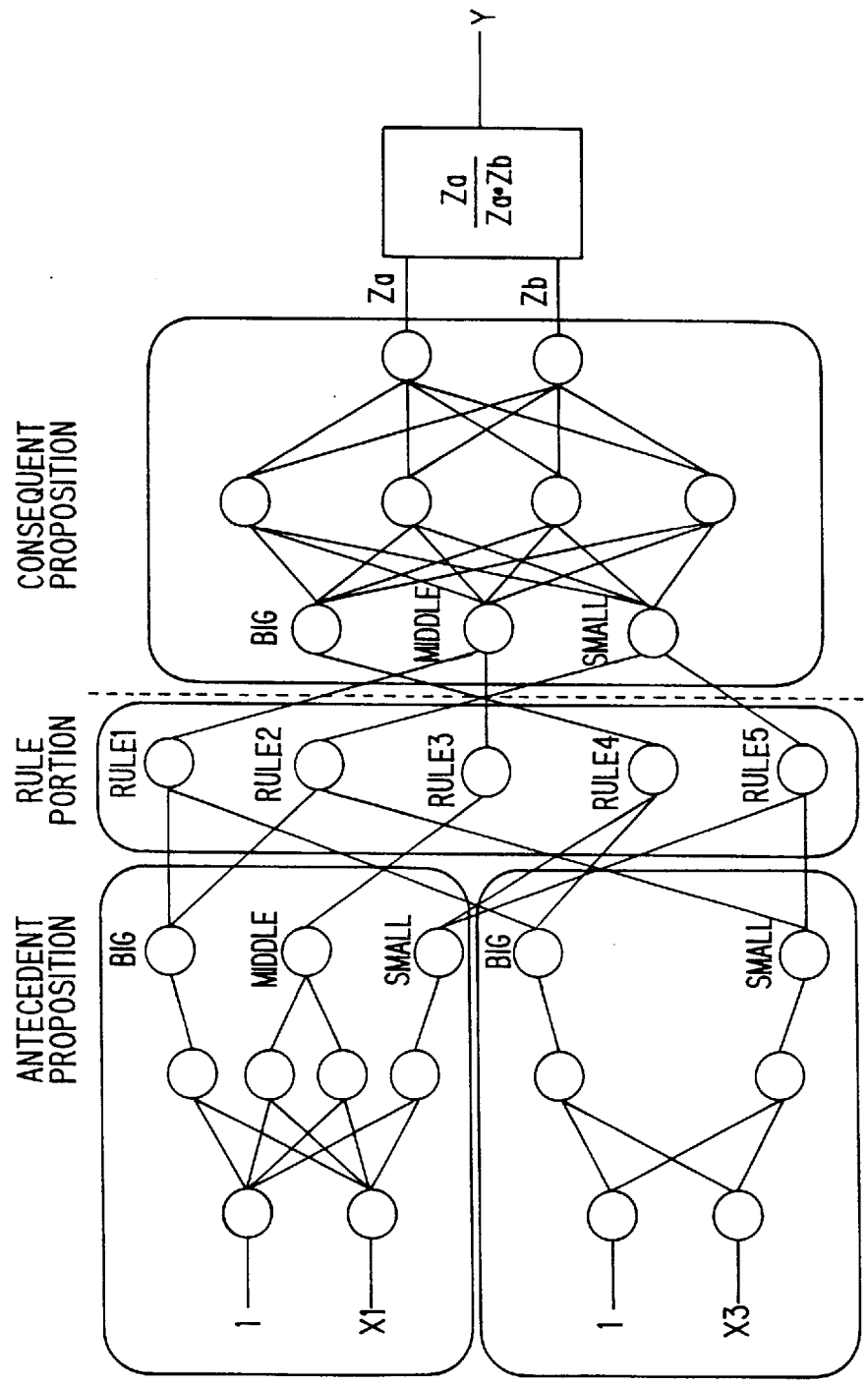
FIG. 3 is a configurational diagram showing a conventional neurofuzzy system.
Figure 4:
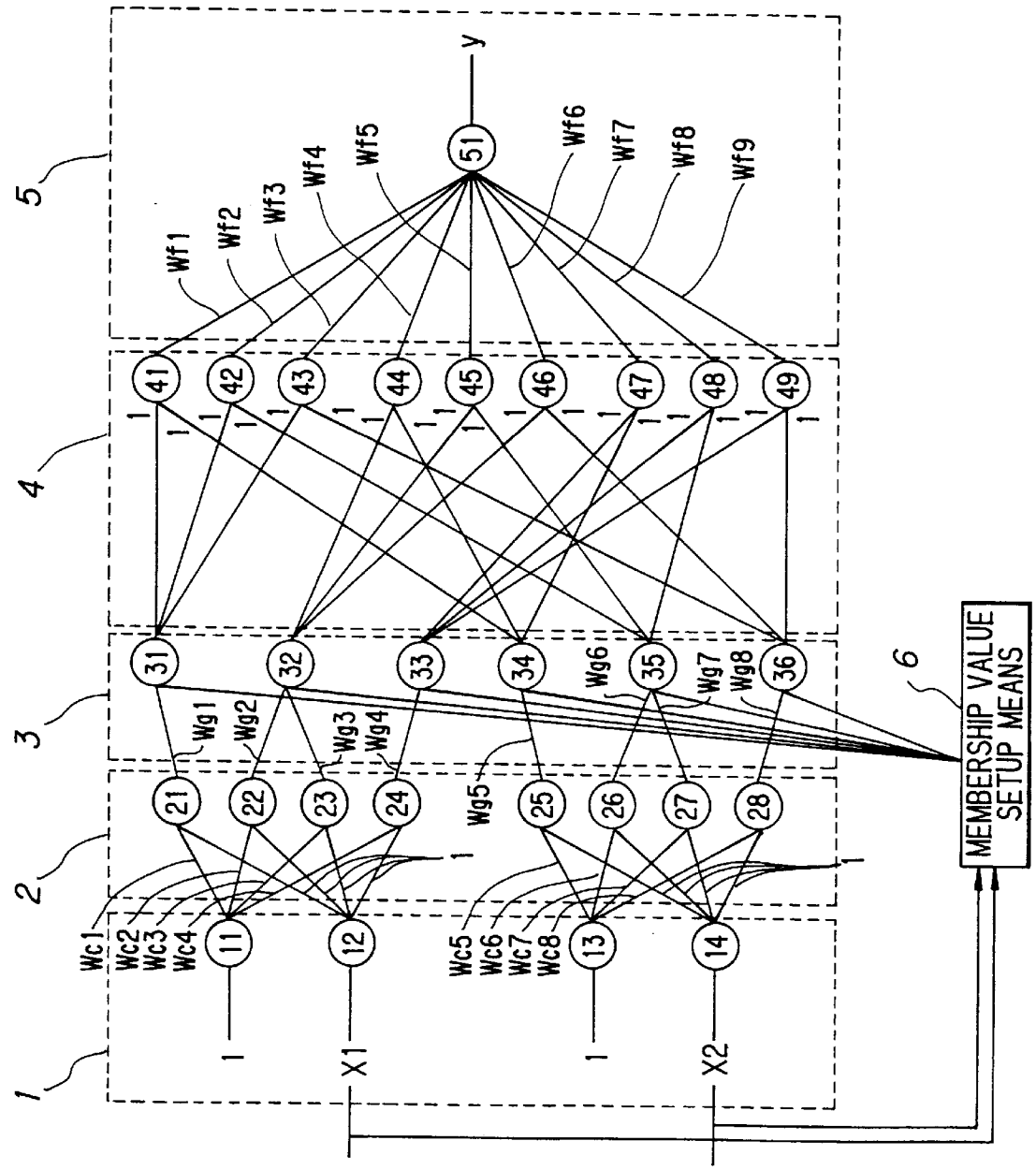
FIG. 4 is a configurational diagram showing an embodiment of a fuzzy-neural network system in accordance with invention.

FIG. 4 is a configurational diagram showing an embodiment of a fuzzy-neural network system in accordance with invention. This system is composed of a two-input/one-output fuzzy-neural network for producing one output parameter to a target based on two input parameters. This network includes five layers, namely, an input layer 1, a membership layer front-half portion 2, a membership layer rear-half portion 3, a rule layer 4 and an output layer 5. The second and third layers constitute a membership layer. Although this embodiment is described as to the two-input/one-output fuzzy-neural network for brevity of the explanation, the present invention can of course be applied to multi-input/multi-output fuzzy-neural network systems having three input or more and two output or more. Each layer is composed as follows: First, in the input layer 1, two units 11 and 12 are allotted to one input parameter while two units 13 and 14 are allotted to another input parameter. That is, the unit 12 is supplied with an input value x1 and the unit 14 is supplied with another input value x2 while the units 11 and 13 are both supplied with a constant '1'.

Figure 5:
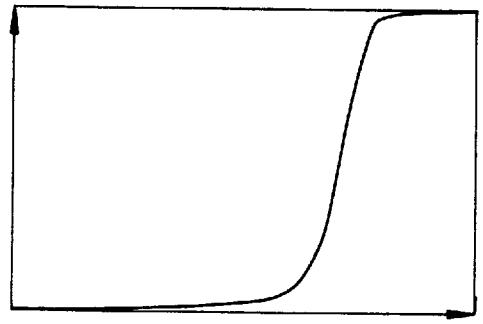
FIG. 5 shows membership functions for Big, Middle and Small.
Figure 5:
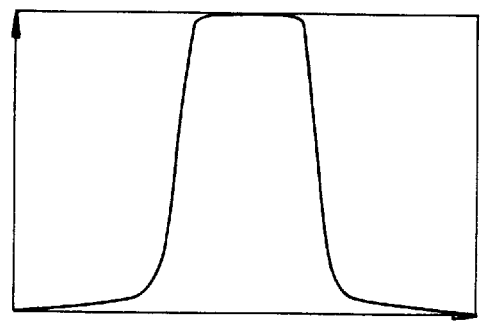
Figure 5:
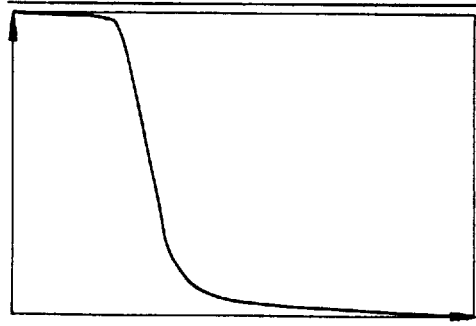

Next, the membership layer 2 or 3 forms membership functions for Big, Middle and Small for each of the input parameters, as shown in FIG. 5. The membership layer front-half portion 2 is composed of a pair of four units 21 to 24 and 25 to 28. The input value x1 is coupled with the constant '1' in each of the units 21 through 24 while the input value x2 is coupled with the constant '1' in each of the units 25 through 28. In each of membership functions shown in FIG. 5, the axis of abscissa represents the value of an input parameter and the axis of ordinate represents the degree in which the condition indicated by an input parameter is suitable to the region (to be referred to as suitability). As the suitability of an input parameter becomes closer to 1.0, the condition indicated by the input parameter becomes more satisfied to the specific region.

The membership layer rear-half portion 3 is composed of a pair of three units 31 through 33 and 34 through 36. Each unit is coupled with one or two units in the front-half portion. Units 31 and 34 which each are coupled with one unit, form respective membership functions for Big while unit 33 and 36 which also are coupled with one unit, form respective membership functions for Small. Unit 32 and 35 which each are coupled with two units, form respective membership functions for Middle.

The number of units for each parameter surely is fixed in each of the input layer 1, the membership layer front-half portion 2 and the membership layer rear-half portion 3 such that two units are allotted in the input layer 1 for each parameter, four units in the front-half portion 2, and three units in rear-half portion 3. Accordingly, if there are three kinds of input, the input layer 1 has six units, the membership layer front-half portion 2 has twelve units and the membership layer rear-half portion 3 has nine units.

Next, the rule layer 4 is composed of: three units 41 through 43 which each make a logical product of the output from the unit 31 on the side of the input value x1 and one of outputs from the units 34 to 36 on the side of the input value x2; three units 44 through 46 which each make a logical product of the output from the unit 32 on the side of the input value x1 and one of outputs from the units 34 to 36 on the side of the input value x2; and three units 47 through 49 which each make a logical product of the output from the unit 33 on the side of the input value x1 and one of outputs from the units 34 to 36 on the side of the input value x2.

Finally, the number of units in the output layer 5 is determined depending on the number of output parameters. Outputs from all the units in rule layer 4 are totally put together in an output unit 51, which in turn outputs an output value 'y'.

Figure 6:
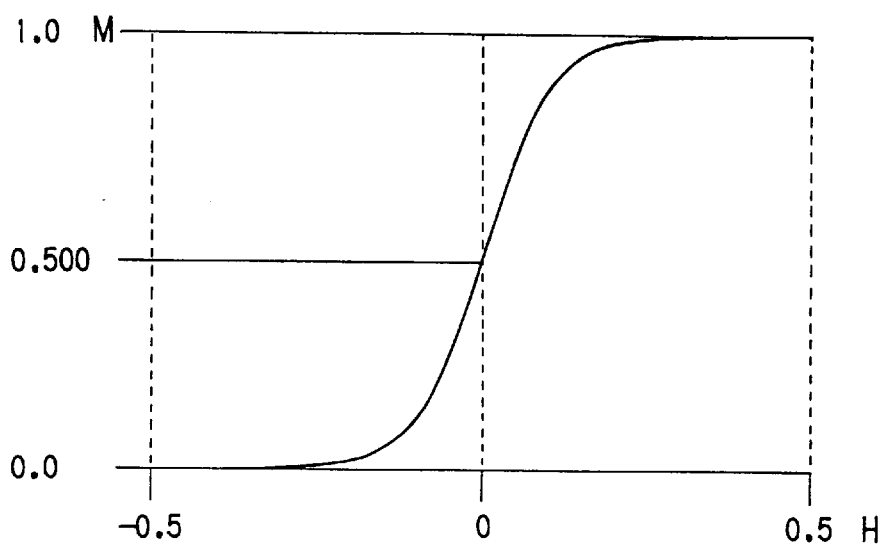
FIG. 6 is a view showing a forming method of a membership function using a sigmoid function.

Each connection between two units in the thus configured network, has its own weight. First, in the connecting part between the input layer 1 and the membership layer front-half portion 2, the central value (the input value when the output value from the membership function is equal to 0.5) in a membership function as shown in FIG. 6 represents its weight for the connection. The weights are denoted by Wc1 to Wc8.

Figure 7:
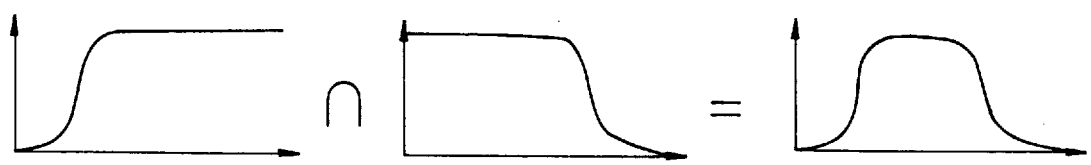
FIG. 7 is a view showing a forming method of a membership function for Middle.

As stated above, there are three kinds of membership functions. Central values in these membership functions correspond to respective weights. For example, the central value in a membership function of the input value x1 for representing Big is Wc1; the central values in a membership function for Middle are Wc2 and Wc3; and the central value in a membership function for Small is Wc4. Similarly, the weights Wc5 to Wc8 on the side of the input value x2 can be defined. Here, since the function for Middle is in the form of a logical product between the two membership functions for Big and Small as shown in FIG. 7, the function has two central values.

Next, in the connecting part between the front-half portion 2 and the rear-half portion 3 in the membership layer, the gradient at the central value of a membership function shown in FIG. 6 represents its weight. The weights are denoted by Wg1 to Wg8. Similarly to the center values, the gradient at the central value in each membership function corresponds to its weight. For example, the gradient at the central value in the membership function of the input value x1 for Big is Wg1; the gradients at the central values in the membership function for Middle are Wg2 and Wg3; and the gradient at the central value in the membership function for Small is Wg4. Also in this case, since the function for Middle is in the form of a logical product between the two membership functions for Big and Small, the function has two gradient values.

Finally, the connecting part between the rule layer 4 and the output layer 5, weights Wf1 to Wf9 are determined based on expert knowledge obtained.

Next, a membership-value setup means 6 is provided outside the network. When some of input parameters are unknown, the membership-value setup means 6 forcibly sets corresponding membership values to the unknown values, at prescribed values in the membership layer rear-half portion 3, so that the system can start calculative operations from the rule layer 4, without effecting calculative operations from the input layer 1 to the membership layer rear-half portion 3.

Figure 8:
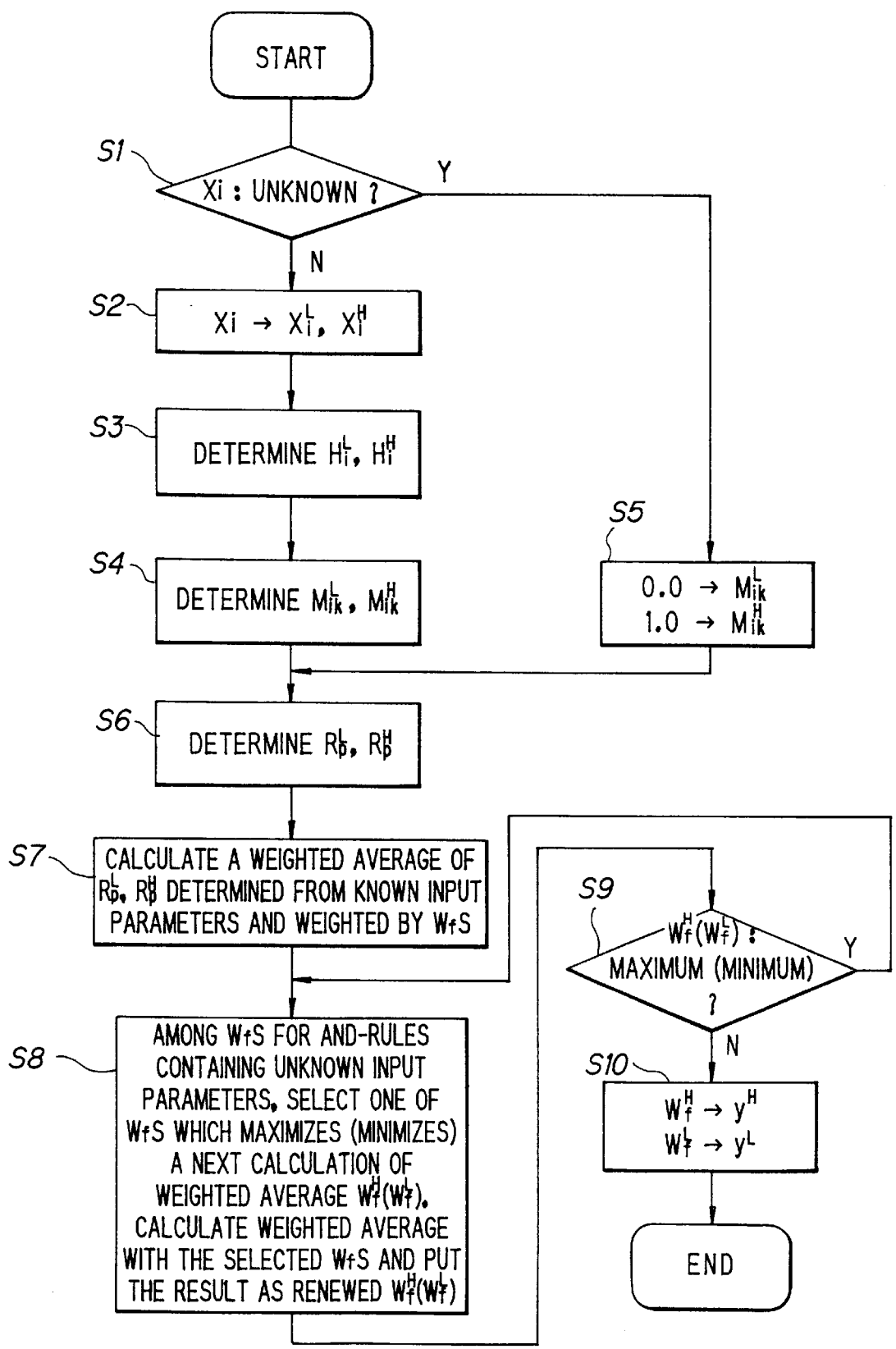
FIG. 8 is a flowchart showing steps for determining output values to be outputted from each of layers when input parameters are inputted to the input layer.

Referring now to a flowchart shown in FIG. 8, description will be made on how output values from different layers are determined when a plurality of input values $x_i$ (i=1, 2, ..., n) are inputted as input parameters to the input layer 1.

Initially, a judgment is made on whether there are any unknown values in the input parameters or input values $x_1$ (Step S1). This judgment is done by an unillustrated input means. If all the input values $x_i$ are known, the input means sets up each $x_i$ to two parts or sets up the same $x_i$, as a maximum $x^H_i$ and a minimum $x^L_i$ (Step S2). At that moment, for a known input value, the maximum and minimum values are set at the same value or at the known input parameter. For example, if the input value is 0.6, the maximum $x^H_i$ is set at 0.6 and the minimum $x^L_i$ is also set at 0.6.

Subsequently, a series of calculations will be done from the input layer 1. Since the output value from the input layer 1 is equal to two values $x^H_i$ and $x^L_i$ which have been obtained by allotting the input parameter to two parts, the description is omitted. Then, output values $H^H_i$ and $H^L_i$ from the membership layer front-half portion 2 are determined (Step S3).

$$\begin{cases} H^H_{ij} = x^H_i + w_{c_{ij}} \\ H^L_{ij} = x^L_i + w_{c_{ij}} \end{cases} \{i: 1, 2, \ldots n\} \{j: 1, 2, 3, 4\} \quad (1)$$

The above Eqs. (1) are formulae for determining output values from the membership layer front-half portion 2. In these formulae, $H^H_{ij}$ is a maximum of the output value from the membership layer front-half portion 2 and $H^L_{ij}$ is a minimum thereof. Wc is a weight representing the central value of a membership function as stated above. The subscript i denotes a number allotted to an input parameter as stated above. That is, the network has 'n' input parameters.

The subscript j denotes a number allotted to a sigmoid function for producing each membership function. The membership function for Small is designated by 1; the membership function for Middle is designated by 2 and 3; and the membership function for Big is designated by 4. For example, $H^H_{24}$ indicates a membership function representing Big for the second input parameter, or the maximum value of the output value from the unit 34.

When an input parameter is known, the input layer 1 outputs an identical value as '$x^H_i$ and $x^L_i$.' Accordingly, the membership layer front-half portion 2 also outputs an identical value as '$H^H_{ij}$ and $H^L_{ij}$'.

Next, output values $M^H_{ik}$ and $M^L_{ik}$ from the membership layer rear-half portion 3 are determined (Step S4).

(Small: j=1, k=1)

$$\begin{cases} M^H_{ik} = f(H^L_{ij} \cdot w_{g_{ij}}) \\ M^L_{ik} = f(H^H_{ij} \cdot w_{g_{ij}}) \end{cases} \quad (2a)$$

(Middle: j=2, k=2)

$$\begin{cases} M^H_{ik} \leq \min\{f(H^H_{ij} \cdot w_{g_{ij}}), (H^L_{ij+1} \cdot w_{g_{ij+1}})\} \\ M^L_{ik} = \min\{f(H^L_{ij} \cdot w_{g_{ij}}), (H^H_{ij+1} \cdot w_{g_{ij+1}})\} \end{cases} \quad (2b)$$

(Big: j=4, k=3)

$$\begin{cases} M^H_{ik} = f(H^L_{ij} \cdot w_{g_{ij}}) \\ M^L_{ik} = f(H^H_{ij} \cdot w_{g_{ij}}) \end{cases} \quad (2c)$$

Eqs. (2a) to (2c) are formulae for determining output values from the membership layer rear-half portion 3. Here, $M^H_{ik}$ is a maximum of the output value from the membership layer rear-half portion 3 and $M^L_{ik}$ is a minimum thereof. Wg is a weight representing the gradient of a membership function at its central value, as stated above. The gradient of a membership function at its central value indicates a rate of inclination of the membership function at a point where the suitability is equal to 0.5. The greater the absolute value of this value, the steeper the slope of the membership function. When this value is positive, it indicates the gradient of a membership function for Big. When this value is negative, it indicates the gradient for a membership function for Small. The subscript k is a number representing each of membership functions, or specifically, 1 designates Small, 2 designates Middle and 3 designates Big.

A function f(t) indicates a sigmoid function and outputs a value ranging from 0.0 to 1.0 for an input variable ranging $-\infty$ to $+\infty$. The general form of a sigmoid function is written as:

$$f(t)=1/(1+e^{-t}).$$

The derivative of the function can be represented using the original function and written as:

$$f'(t)=(1-f(t)) \cdot f(t).$$

By using a sigmoid function in an appropriate manner, a membership function can be expressed by a sigmoid function. That is, a sigmoid function is adjusted such that the input value to the sigmoid function when the sigmoid function takes a value of 0.5 is set at the input value of the membership function or the central value when the output of the membership function is equal to 0.5 and the gradient is set in the similar manner. For this reason, each membership function needs to have its central value and its gradient at the central value as variables. These variables are $Wc_{ij}$ and $Wg_{ij}$ as already shown in the above formulae.

Thus, when the variable range of each input parameter is divided into three regions namely, Big, Middle and Small, how the condition designated by an input parameter is suitable to the above different ranges can be calculated as a fuzzy membership value, using the above formulae. Here, since '$H^H_{ij}=H^L_{ij}$' when an input parameter is known, $M^H_{ik}$ and $M^L_{ik}$ become equal.

When it is determined in Step S1 that there are some unknown values among the input parameters, the membership-value setup means 6 forcibly sets up prescribed values into corresponding units in the membership layer rear-half portion 3 (Step S5).

The prescribed values to be set up in Step S5 must range from the minimum value to the maximum value as the input value $x_i$ varies in a range from the left end to the right end in the graph shown in FIG. 5. Since the minimum value and the maximum value taken within the range should be outputted as the prescribed value, the prescribed values are set up at a maximum value of '$M^H_{ik}=1.0$' and at a minimum value of '$M^L_{ik}=0.0$'.

Here, it should be noted that if the input value x1 is known, the operation for the input value x1 is to be done from Step S2 to S4 while if the input value x2 is unknown, the operation for the input value x2 is effected from Step S5.

Next, output values $R^H_p$ and $R^L_p$ from the rule layer 4 are determined (Step S6).

$$\begin{cases} R_p^H = \{\min M^H_{i_1k_1}, M^H_{i_2k_2}\} \\ R_p^L = \{\min M^L_{i_1k_1}, M^L_{i_2k_2}\} \end{cases} \quad (3)$$

$$p: 1, 2, \ldots, 3^2 \times {}_nC_2 \left(= \frac{9n(n-1)}{2}\right)$$

Eqs. (3) are formulae for determining output values from the rule layer 4. Here, $R^H_p$ is a maximum of output values from the corresponding AND rules and $R^L_p$ is a minimum of output values from the corresponding AND rules. The subscript 'p' ranges from 1 to a number of AND rules. The number of AND rules is $3^2 \times {}_nC_2$, or the number of combinations when there is 'n' input parameters, each of which is distributed into three regions and two output values for different input parameter are selected.

The function, min $\{M_1, M_2\}$ is a function for outputting a value by selecting a minimum value of the two output values M1 and M2 from the membership rear-half portion 3 and to taking a logical product between two fuzzy sets (membership functions). Taking a logical product between two fuzzy sets is to seek a suitability to a target AND rule, for example, in the following manner. Consider a case where an AND rule is '$x_1$ is Big' AND '$x_2$ is Small'. In this case, the suitability to the AND rule is outputted by selecting a smaller value from the two output values, i.e., the output value from the membership function representing that an input value $x_1$ belongs to Big and the output value from the membership function representing that an input value $x_2$ belongs to Small. Here, if M1 and M2 are both known input parameters, the following relation holds:

$R^H_p = R^L_p$ (because $M^H_{i1k1} = M^L_{i1k1}$ & $M^H_{i2k2} = M^L_{i2k2}$).

Next, output values $y^H_q$ and $y^L_q$ are determined (Steps through S10). First, the following calculations are effected using the output values only from the AND rules that do not contain any unknown value as input parameters (Step S7).

$$\begin{cases} y_q^H = \frac{\sum\limits_{r_{comp}} (R_r^H \cdot w_{f_r})}{\sum\limits_{r_{comp}} R_r^H} & y_q^L = \frac{\sum\limits_{r_{comp}} (R_r^L \cdot w_{f_r})}{\sum\limits_{r_{comp}} R_r^L} \end{cases} \quad (4)$$

Here, $y^H_q$ is a maximum of the output values from the output layer 5 and $y^L_q$ is a minimum of the output values from the output layer 5. The subscript 'q' indicates a serial number of an output parameter, the subscript 'r' designates a serial number of an AND rule, the subscript 'comp' sands for AND rules not containing unknown input parameters. Accordingly, $r_{comp}$ indicates a serial number of an AND rule selected as an AND rule with no unknown input parameter. That is, the denominators in the formulae (4) indicate calculations of summing all the output values from AND rules which contain no unknown input parameter. Wf indicates a weight for the output value from an AND rule, as stated heretofore. In the above case, '$R^H_r=R^L_r$' holds.

Then, by renaming '$y^H_q$' as '$w^H_{qave}$', $w^H_{qave}$ qave is compared with weights '$Wf_{rmiss}$' of AND rules which contain unknown input parameters, in order to extract weights '$Wf_{rmiss}$' equal to or greater than '$w^H_{qave}$'. Among the thus extracted weights '$Wf_{rmiss}$' which satisfy the relation '$Wf_{rmiss} \geq w^H_{qave}$', a maximum weight $Wf_{pmiss}$ is selected, whereby the following calculation shown in formula (5) is made using the maximum weight (Step S8). Here, the subscript 'miss' indicates an AND rule containing unknown input parameters. Accordingly, the subscript 'rmiss' indicates a serial number of an AND rule selected as an AND rule with unknown input parameters, from all the AND rules. The subscript 'qave' indicates a value which is obtained as a current weighted average from the formulae (4) or (5).

When the minimum value '$y^L_q$' is determined, the similar process is to be done. That is, by renaming '$y^L_q$' as '$w^L_{qave}$', $w^L_{qave}$ is compared with weights '$Wf_{rmiss}$' with unknown input parameters, in order to extract weights '$Wf_{rmiss}$' equal to or smaller than '$w^L_{qave}$'. Of the thus extracted weights '$Wf_{rmiss}$' which satisfy the relation '$Wf_{rmiss} \leq w^L_{qave}$', a minimum weight $Wf_{pmiss}$ is selected, whereby the following calculation shown in formula (5) is made using the minimum weight (Step S9).

$$\begin{cases} y_q^H = y_q^H + \dfrac{R^H_{P_{miss}} \cdot W_{f_{pmiss}}}{\sum\limits_{r_{ave}} R_r^H + R^H_{p_{miss}}} & W_{f_{pmiss}} \geq W^H_{qave} \\ \qquad\qquad W_{f_{pmiss}} \geq w^H_{qave} & \\[2pt] y_q^L = y_q^L + \dfrac{R^L_{P_{miss}} \cdot W_{f_{pmiss}}}{\sum\limits_{r_{ave}} R_r^L + R^H_{p_{miss}}} & W_{f_{pmiss}} \leq W^H_{qave} \\ \qquad\qquad W_{f_{pmiss}} \geq w^L_{qave} & \end{cases} \quad (5)$$

In the case of the maximum '$y^H_q$', Steps S8 and S9 are repeated until there is no more $Wf_{rmiss}$ which satisfies '$Wf_{rmiss} \geq w^H_{qave}$'.

In the case of the minimum '$y^L_q$', Steps S8 and S9 are repeated until there is no more $Wf_{rmiss}$ which satisfies '$Wf_{rmiss} \leq w^L_{qave}$'. By these operations, the maximum and minimum in the final output are represented as follows:

$$y_q^H = \begin{cases} \dfrac{\sum\limits_{\substack{r_{comp}}} (R_r^H \cdot w_{f_r}) + \sum\limits_{\substack{r_{miss} \\ w_{f_r} \geq w_{q_{ave}}^H}} (R_r^H \cdot w_{f_r}) + \sum\limits_{\substack{r_{miss} \\ w_{f_r} \geq w_{q_{ave}}^H}} (R_r^L \cdot w_{f_r})}{\sum\limits_{r_{comp}} R_r^H + \sum\limits_{\substack{r_{miss} \\ w_{f_r} \geq w_{q_{ave}}^H}} R_r^H + \sum\limits_{\substack{r_{miss} \\ w_{f_r} \geq w_{q_{ave}}^H}} R_r^L} \approx \dfrac{\sum\limits_{r_{comp}} (R_r^H \cdot w_{f_r}) + \sum\limits_{\substack{r_{miss} \\ w_{f_r} \geq w_{q_{ave}}^H}} (R_r^H \cdot w_{f_r})}{\sum\limits_{r_{comp}} R_r^H + \sum\limits_{\substack{r_{miss} \\ w_{f_r} \geq w_{q_{ave}}^H}} R_r^H} \\[2em] \dfrac{\sum\limits_{r_{comp}} (R_r^L \cdot w_{f_r}) + \sum\limits_{\substack{r_{miss} \\ w_{f_r} \geq w_{q_{ave}}^L}} (R_r^H \cdot w_{f_r}) + \sum\limits_{\substack{r_{miss} \\ w_{f_r} \geq w_{q_{ave}}^L}} (R_r^L \cdot w_{f_r})}{\sum\limits_{r_{comp}} R_r^H + \sum\limits_{\substack{r_{miss} \\ w_{f_r} \geq w_{q_{ave}}^L}} R_r^H + \sum\limits_{\substack{r_{miss} \\ w_{f_r} \geq w_{q_{ave}}^L}} R_r^L} \approx \dfrac{\sum\limits_{r_{comp}} (R_r^L \cdot w_{f_r}) + \sum\limits_{\substack{r_{miss} \\ w_{f_r} \geq w_{q_{ave}}^L}} (R_r^H \cdot w_{f_r})}{\sum\limits_{r_{comp}} R_r^L + \sum\limits_{\substack{r_{miss} \\ w_{f_r} \geq w_{q_{ave}}^L}} R_r^H} \end{cases} \quad (6)$$

These procedures are taken for the following reason: That is, the final output value is calculated as a weighted average. In the case of determining the maximum '$y^H_q$', if there is a greater value, even if it is slightly greater, than an intermediate output value obtained in the course of the calculation, another weighted average which is surely greater than the above intermediate output is obtained by the calculation involving the greater value. On the contrary, in the case of determining the minimum '$y^L_q$', if there is a smaller value, even if it is slightly smaller, than an intermediate output value obtained in the course of the calculation, another weighted average which is surely smaller than the above intermediate output is obtained by the calculation involving the smaller value. Therefore, by these calculations, it is possible to determine maximum and minimum values of the output values from given AND rules. This is why the above procedures are taken.

The maximum $w^H_{q_{ave}}$ and the minimum $w^L_{q_{ave}}$ in the formulae (6) are the averages of the weights after the repeated procedures of Steps S8 and S9 have been completed. Weights $Wf_p$ indicate weights representing the degree of importance for respective AND rules.

In the rightmost side of the above formulae (6), approximated expressions are shown in which third terms of both the numerator and the denominator in the middle expression are omitted. This approximation can be justified by the following fact:

Minimum values of the membership values for unknown input parameters are substantially zero and therefore, all the minimum values of the output values from the AND rules involving unknown input parameters necessary become substantially zero because of the min function. As a result, all $R^L_{r_{miss}}$ become zero, so that the third terms in both the numerator and the denominator can conceivably be neglected, in order to simplify the calculations.

Figure 9:
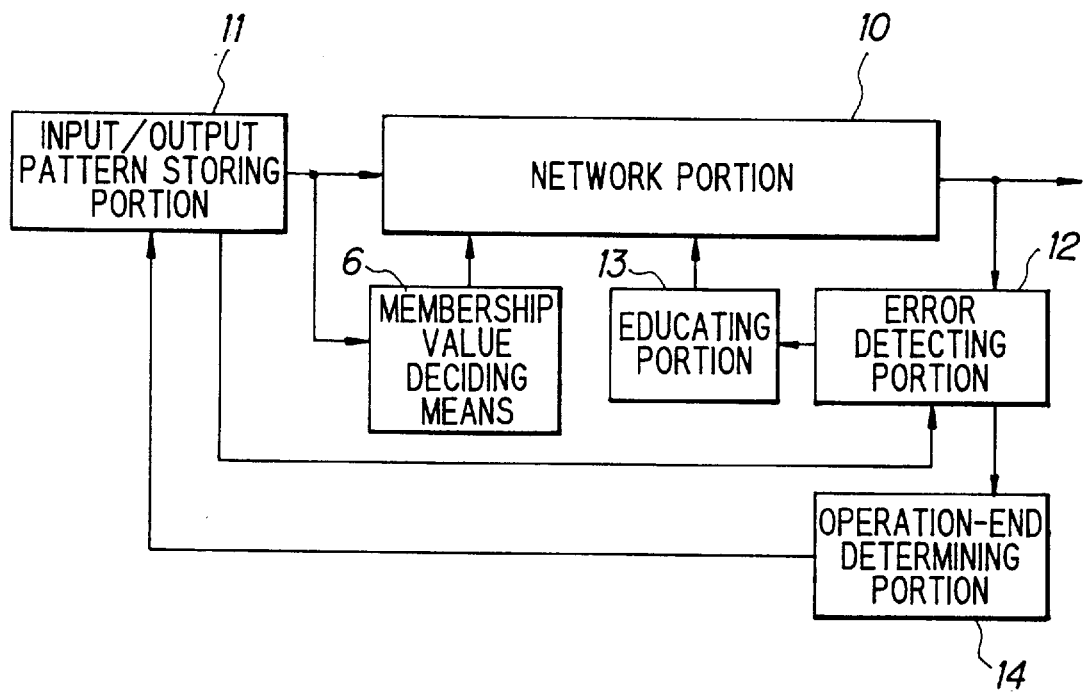
FIG. 9 is a block diagram showing a fuzzy-neural network system at its learning mode in accordance with the invention.

Now, a learning method in the fuzzy-neural network system of the invention will be described. FIG. 9 shows a block diagram at the learning mode. In the figure, a network portion 10 represents the input layer 1 to the output layer 5. The system further includes: an input/output pattern storing portion 11; an error detecting portion 12 for detecting deviation of the output pattern from the network portion 10 from a target output pattern stored in the I/O pattern storing portion 11; an educating portion 13 for educating the network portion 10 based on the error detected in the error detecting portion 12 so that the network 10 properly reproduces the pattern stored in the I/O pattern storing portion 11; and an operation-end determining portion 14 for informing the I/O pattern storing portion 11 of the end of the teaching, as the error detected in the error detecting portion 12 becomes below a certain predetermined value.

Figure 10:
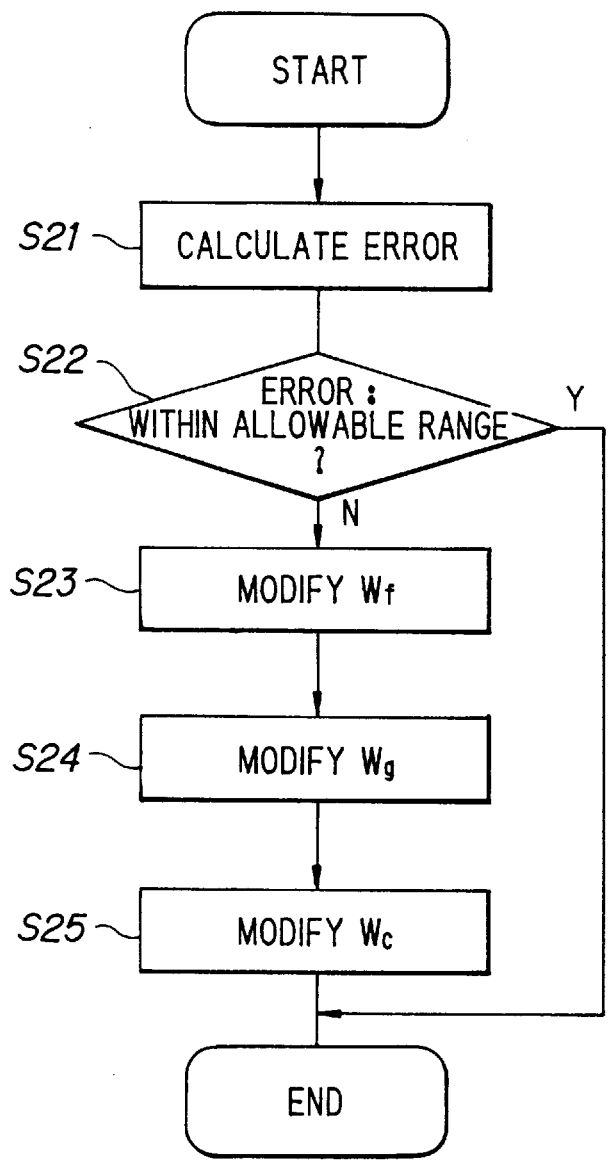
FIG. 10 is a flowchart showing steps of correcting weights of each layer at the learning mode.

Referring to a flowchart shown in FIG. 10, the learning steps will be described. First, deviations of an output value Tq (to be referred to, hereinbelow, as 'teacher data') to be reproduced by the simulation, from the output values $y^H_q$ and $y^L_q$ obtained from the output layer 5 of the network portion 10 by the previously described process, is determined in the error detecting portion 12 (Step S21).

$$E = \sum_q \frac{(T_q - y_q^H)^2}{2} + \sum_q \frac{(T_q - y_q^L)^2}{2} \quad (7)$$

Eq. (7) is a formula for determining the error E. If this error is within an allowable range, there is no need for adjustment, so that the operation is ended. If the error is beyond the allowable range, the weights in the network are adjusted in order to make the error fall within the allowable range (Step S22). Upon the adjustment of weights, however, there is no information on how each of the weights should be adjusted or whether each weight should be increased or decreased. For this purpose, it is necessary to determine the influence of each weight upon the error and based on the analysis, each of weights may and should be adjusted little by little so that the error is made small.

In order to determine the influences of weights, it is necessary to know variations (increase/decrease) of the error in association with changes (increase/decrease) of the weights. To do this, Eq. (7) should be partially differentiated with respect to each of the weights. These calculations give the gradients of the error function E with respect to variations of respective weights. When the gradient of a weight is equal to zero, the value of the weight at that time could make the error small.

However, a weight value at which the gradient is zero does not necessarily make the error least. This is because that, in general, a function of a variable takes a local minimum at a value where the gradient of the function is zero. Nevertheless, since initial values to be allotted to the weights are set up based on the fuzzy rules relating to the target input/output relationship; if the rules are correct, the weights can be assumed to have values which are not much different from correct values.

That is, in such a case, a local minimum can be justified to be the minimum value. Since the system is educated by the data as to the correct input/output relationship; even if some of the fuzzy rules are wrong, the weights corresponding to the wrong rules are also adjusted in accordance with the correct data. As a result, the weight determined might not be able to minimize the error but at least make the error locally minimum, so that it is possible to make the error relatively small.

Next, explanation will be made on the learning method of adjusting each weight.

$$\frac{\partial E}{\partial y_q} = \frac{\partial E}{\partial y_q^H} + \frac{\partial E}{\partial y_q^L} \quad (8a)$$

$$\frac{\partial E}{\partial y_q} = -(T_q - y_q^H) - (T_q - y_q^L) \quad (8b)$$

Eqs. (8a) and (8b) are prepared for partial differentiation with respect to each weight and the formulae for determining the influence of the output upon the error function. As shown in Eq. (8a), the partial differential by an output variable can be determined by the partial differentiation of the error function by the maximum and the minimum of the output. Eq. (8b) is an explicit form of the partial differential.

Then, partial differentials with respect to each of the weights are calculated by using the above relation. First, the error function is partially differentiated with respect to each of the weights Wf that each represent the degree of importance of the rules (Step S23).

$$\frac{\partial E}{\partial w_{f_p}} = \frac{\partial E}{\partial y_q^H} \frac{\partial y_q^H}{\partial w_{f_p}} + \frac{\partial E}{\partial y_q^L} \frac{\partial y_q^L}{\partial w_{f_p}} \quad (9a)$$

$$\frac{\partial E}{\partial w_{f_p}} = -(T_q - y_q^H) \frac{R_p^H}{\sum\limits_{r_{comp}} R_r^H + \sum\limits_{r_{miss}} R_r^H} - \quad (9b)$$

$$w_{f_r} \geq w_{q_{ave}}^H$$

$$(T_q - y_q^L) \frac{R_p^L}{\sum\limits_{r_{comp}} R_r^L + \sum\limits_{r_{miss}} R_r^H}$$

$$w_{f_r} \leq w_{q_{ave}}^L$$

$$\frac{\partial E}{\partial w_{f_p}} = \quad (9c)$$

$$w_{f_p} \geq w_{q_{ave}}^H$$

$$-(T_q - y_q^H) \frac{R_p^L}{\sum\limits_{r_{comp}} R_r^H + \sum\limits_{r_{miss}} R_r^H} \left( \because \frac{\partial y_q^L}{\partial w_{f_p}} = 0 \right)$$

$$w_{f_r} \geq w_{q_{ave}}^H \quad w_{f_c} \geq w_{q_{ave}}^H$$

$$\frac{\partial E}{\partial w_{f_p}} = \quad (9d)$$

$$w_{f_p} \leq w_{q_{ave}}^L$$

$$-(T_q - y_q^L) \frac{R_p^L}{\sum\limits_{r_{comp}} R_r^L + \sum\limits_{r_{miss}} R_r^H} \left( \because \frac{\partial y_q^H}{\partial w_{f_p}} = 0 \right)$$

$$w_{f_r} \leq w_{q_{ave}}^L \quad w_{f_c} \leq w_{q_{ave}}^L$$

$$\frac{\partial E}{\partial w_{f_p}} \quad (9e)$$

$$w_{q_{ave}}^L \leq w_{f_p} \leq w_{q_{ave}}^H$$

From Eq. (9a), the influence of the variation of the weight $Wf_p$ upon the error function is determined. The actual partial differential forms are shown in Eqs. (9b) to (9e). Here, Eq. (9c) has a form in which a second term on the right side of Eq. (9b) is eliminated. Eq. (9d) has a form in which a first term on the right side of Eq. (9b) is eliminated. This is because that in the aforementioned Eqs. (6), the maximum $y_q^H$ contains the weights equal to or above $w_{q_{ave}}^H$ as the weights of AND rules that contain unknown input parameters and no weight smaller than $w_{q_{ave}}^H$ appears in the approximated formula. Similarly, the minimum $y_q^L$ contains the weights equal to or below $w_{q_{ave}}^L$ as the weights of AND rules that contain unknown input parameters and no weight greater than $w_{q_{ave}}^L$ appears in the approximated formula.

Since the weights of AND rules without unknown input parameters are used in both the output values $y_q^H$ and $y_q^L$, two terms appears as seen on the right side of Eq. (9b). In the AND rules containing unknown input parameters, there ought to exist $Wf_p$'s which satisfies the relation:

$$w_{q_{ave}}^L \leq wf_p \leq w_{q_{ave}}^H,$$

however, these weights will not appear in either of the approximated formulae in Eqs. (6). That is, these weights do not have any influence upon the output values and therefore they cannot affect the error. Accordingly, these weights are set at zero.

Next, the error function is partially differentiated with respect to each of weights Wg which each represent the gradient of a membership function at its center value (Step S24).

$$\frac{\partial E}{\partial w_{g_{ij}}} = \frac{\partial E}{\partial y_q^H} \frac{\partial y_q^H}{\partial R_p^H} \frac{\partial R_p^H}{\partial M_{ik}^H} \frac{\partial M_{ik}^H}{\partial w_{g_{ij}}} + \quad (10a)$$

$$\frac{\partial E}{\partial y_q^L} \frac{\partial y_q^L}{\partial R_p^L} \frac{\partial R_p^L}{\partial M_{ik}^L} \frac{\partial M_{ik}^L}{\partial w_{g_{ij}}}$$

(Completed data): $(H_{ij}^H = H_{ij}^L)$ $$\frac{\partial E}{\partial w_{g_{ij}}} = \quad (10b)$$

$$-\sum_q \left( (T_q - y_q^H) \sum_m \left( \frac{w_{f_p} - y_q^H}{\sum\limits_{r_{comp}} R_r^H + \sum\limits_{r_{miss}} R_r^H} \right) \right) (1 - M_{ik}^H) \cdot$$

$$w_{f_r} \geq w_{q_{ave}}^H$$

$$M_{ik}^H \cdot H_{ij}^H -$$

$$\sum_q \left( (T_q - y_q^L) \sum_m \left( \frac{w_{f_p} - y_q^L}{\sum\limits_{r_{comp}} R_r^L + \sum\limits_{r_{miss}} R_r^H} \right) \right) (1 - M_{ik}^L) \cdot$$

$$w_{f_r} \leq w_{q_{ave}}^L$$

$$M_{ik}^L \cdot H_{ij}^L$$

(Missing data): $(H_{ij}^H \neq H_{ij}^L)$ \quad (10c)

$$\frac{\partial E}{\partial w_{g_{ij}}} = 0$$

From Eq. (10a), the influence due to the variation of the weight $Wg_{ij}$ upon the error function is determined. The actual partial differential forms are shown in Eqs. (10b) and (10c). Here, 'm' indicates the number of AND rules used for determining output values in membership functions of which influence is to be determined.

In Eq. (10b), '$(1-M_{ik}^H) \cdot M_{ik}^H$' and '$(1-M_{ik}^L) \cdot M_{ik}^L$' are factors as the result of the deferential of sigmoid functions. Meanwhile, the reason why Eq. (10c) holds or the partial differential is equal to zero is that, as just mentioned above, the partial differential expression contains factors '$(1-M_{ik}^H) \cdot M_{ik}^H$' and '$(1-M_{ik}^L) \cdot M_{ik}^L$' and that in the case that input parameters are unknown, the output values from the membership functions are set so that $M_{ik}^H \approx 1$ and $M_{ik}^L \approx 0$. More clearly, the factors '$(1-M_{ik}^H) \cdot M_{ik}^H$' and '$(1-M_{ik}^L) \cdot M_{ik}^L$' become zero, and consequently, the partial differential value becomes zero.

Finally, the error function is partially differentiated with respect to each of weights Wc which each represent the central value of a membership function (Step S25).

$$\frac{\partial E}{\partial w_{c_{ij}}} = \frac{\partial E}{\partial y_q^H} \frac{\partial y_q^H}{\partial R_p^H} \frac{\partial R_p^H}{\partial M_{ik}^H} \frac{\partial M_{ik}^H}{\partial H_{ij}^H} \frac{\partial H_{ij}^H}{\partial w_{c_{ij}}} + \quad (11a)$$

$$\frac{\partial E}{\partial y_q^L} \frac{\partial y_q^L}{\partial R_p^L} \frac{\partial R_p^L}{\partial M_{ik}^L} \frac{\partial M_{ik}^L}{\partial H_{ij}^L} \frac{\partial H_{ij}^L}{\partial w_{c_{ij}}}$$

(Completed data): $(H_{ij}^H = H_{ij}^L)$ $$\frac{\partial E}{\partial w_{c_{ij}}} = \quad (11b)$$

$$-\sum_q \left( (T_q - y_q^H) \sum_m \left( \frac{w_{f_p} - y_q^H}{\sum_{r_{comp}} R_r^H + \sum_{r_{miss}} R_r^H} \right) \right) (1 - M_{ik}^H) \cdot$$

$$w_{f_r} \geq w_{q_{ave}}^H$$

$$M_{ik}^H \cdot w_{g_{ij}} -$$

$$\sum_q \left( (T_q - y_q^L) \sum_m \left( \frac{w_{f_p} - y_q^L}{\sum_{r_{comp}} R_r^L + \sum_{r_{miss}} R_r^H} \right) \right) (1 - M_{ik}^L) \cdot$$

$$w_{f_r} \leq w_{q_{ave}}^L$$

$$M_{ik}^L \cdot w_{g_{ij}}$$

(Missing data): $(H_{ij}^H \neq H_{ij}^L)$ \quad (11c)

$$\frac{\partial E}{\partial w_{c_{ij}}} = 0$$

From Eq. (11a), the influence due to the variation of the weight $Wc_{ij}$ upon the error function is determined. The actual partial differential forms are shown in Eqs. (11b) and (11c). The reason why Eq. (11c) holds or the partial differential is equal to zero is similar to the reason (10c) holds or the partial differential is equal to zero. That is, the partial differential expression contains factors '$(1-M^H{}_{ik}) \cdot M^H{}_{ik}$' and '$(1-M^L{}_{ik}) \cdot M^L{}_{ik}$' and that in the case that input parameters are unknown, the output values from the membership functions are set so that $M^H{}_{ik} \approx 1$ and $M^L{}_{ik} \approx 0$, whereby the factors '$(1-M^H{}_{ik}) \cdot M^H{}_{ik}$' and '$(1-M^L{}_{ik}) \cdot M^L{}_{ik}$' become zero. Consequently, the partial differential value becomes zero.

Thus, the influences of all the weights upon the error function are determined. Therefore, it is possible to make the error smaller by adjusting the weights in such a direction that these influences reduce or in such a direction designated by the partial differentials multiplied by (−1).

Next, minute variations for finely adjusting the weights are to be determined.

$$\Delta w_{f_p} = -\alpha \frac{\partial E}{\partial w_{f_p}} \quad (12a)$$

$$\Delta w_{s_{ij}} = -\beta \frac{\partial E}{\partial w_{s_{ij}}} \quad (12b)$$

$$\Delta w_{c_{ij}} = -\gamma \frac{\partial E}{\partial w_{c_{ij}}} \quad (12c)$$

$$a = \left( \frac{1}{2+1} \right) \text{ (as an example)} \quad (12d)$$

Here, $\alpha$, $\beta$, $\gamma$ are called as learning parameters and used to control how to adjust the weights. When these parameters are made large, the weights are adjusted in a large amount in the direction as to reduce the error and the learning time can be reduced. But, this setting makes the adjustment rough, so that it is impossible to adjust the system optimally. On the other hand, when these parameters are set at small values, it is possible to adjust the weights minutely but in compensation, the learning time becomes long and in some cases depending upon the initially settings of the weights, the weights cannot be adjusted to minimize the error but could be adjusted to a local minimum and might not escape from the local-minimum trap. Accordingly, it is necessary to set up such learning parameters so as to minimize the error, by changing the learning parameters at some or several times. Alternatively, the learning parameters may be defined as time-dependent functions as in the example of Eq. (12d).

The thus obtained values are added to the current weights, whereby the weights are adjusted. When the number of learning times up to the present is assumed as l (small L), the formulae for adjusting the weights are written as follows:

$$w_{f_p}(l+1) = w_{f_p}(l) + \Delta w_{f_p}(l) \quad (13a)$$

$$w_{s_{ij}}(l+1) = w_{s_{ij}}(l) + \Delta_{s_{ij}}(l) \quad (13b)$$

$$w_{c_{ij}}(l+1) = w_{c_{ij}}(l) + \Delta w_{c_{ij}}(l) \quad (13c)$$

From the above formulae, in the (l+1)th learning operation, the foregoing learning procedures expressed by Eqs. (1) through (13c) are effected using the renewed weights. The learning operation is ended when a prescribed number of times of the learning operations are done or when the values of the error falls within an allowable range prescribed. In the thus configurated operation, it is possible to effect a proper simulation even if there are some unknown values in the given input/output relations.

Now, three specific examples of experiments will be described to which the system of the invention is applied. In the beginning, a first experiment will be described. This experiment is to examine errors in the output results when the system is educated by sample data free from unknown values and sample data partly containing unknown values.

Figure 11:
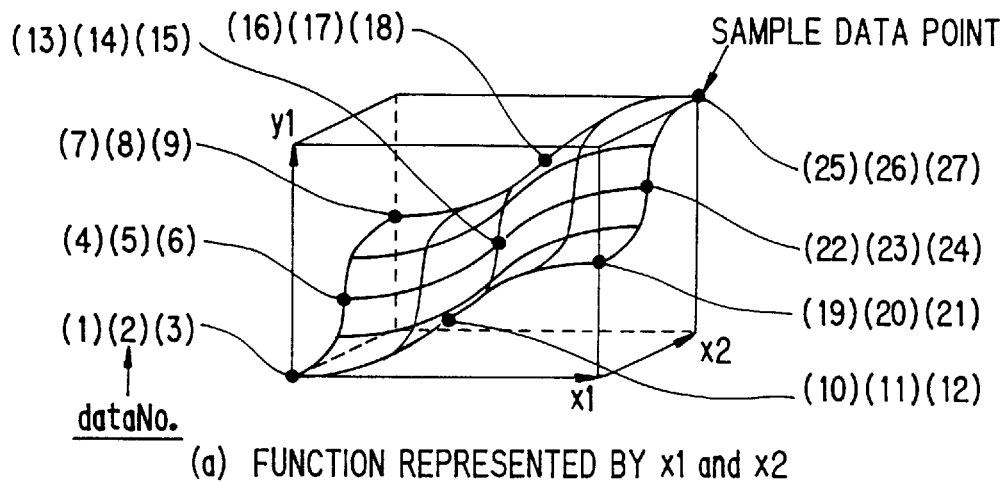
FIG. 11 is a graphic view showing relations of two of three input values versus one output value.
Figure 11:
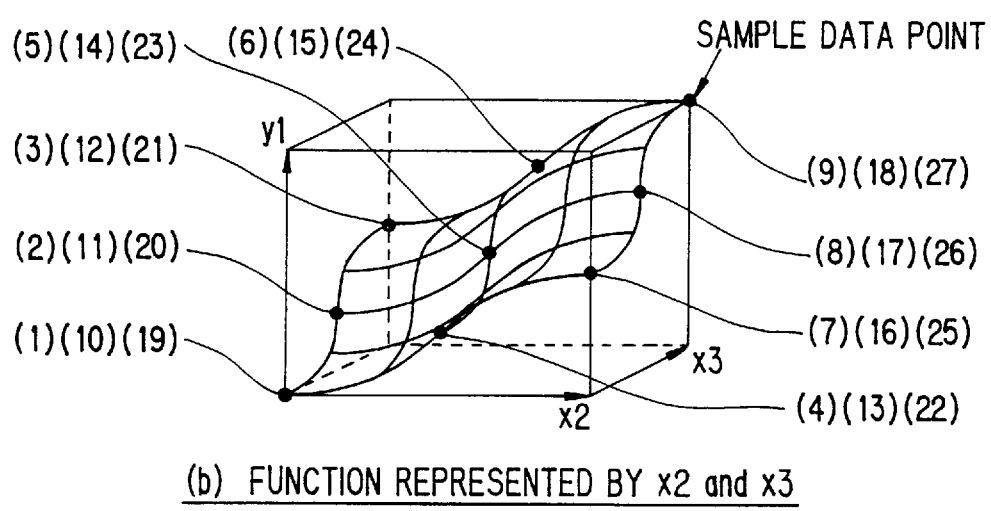
Figure 11:
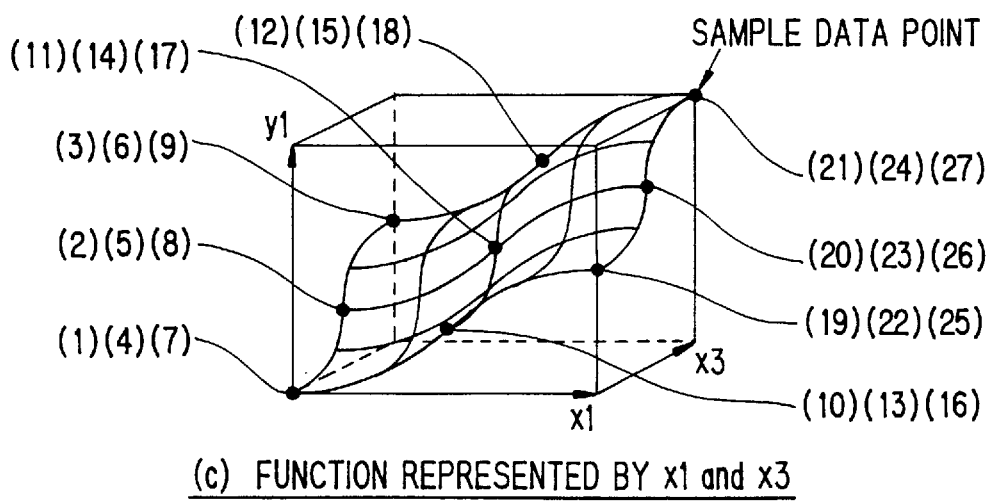

Each sample data is composed of three inputs and one output, and the input are assumed to be Small (=0.0), Middle (=0.5) and Big (=1.0). The output y1 is such a monotonously increasing function that when two of the three inputs are inputted to produce an output, the output always increases as each of the input values are increased. FIG. 11 is a graphic view showing relations of two of the three input values x1, x2 and x3 versus the output value y1. In the figure, numbers in parenthesis represent data numbers (data No.) and indicate points of sample data. These numbers correspond to the data numbers in FIGS. 12 through 14.

FIG. 12 is a table showing output values y1 when sample data composed of input values x1, x2 and x3 as input parameters are free from unknown values. In this table, encircled numbers 1 through 9 indicate the positions of unknown data when one of these data are made unknown to produce nine kinds of toothless sample data 1 to 9.

FIG. 13 is a table showing the result when toothless sample data 1 in which the input value designated at encircled '1' is assumed to be unknown (set at −1.0). In the table, y1' indicates an output value at that time and y1−y1' is a difference from the output value y1 in FIG. 12 where there is no unknown value. The similar operations were effected for remaining toothless sample data 2 through 9. FIG. 14 shows the differences from corresponding output values y1.

From this result, it is understood that there is not so much difference between the output values of the sample data with no unknown value (FIG. 12) and those of the sample data containing one unknown value (FIGS. 13 and 14). The greatest difference or error is 0.354 in the data number 3 of the toothless sample data 9. Other than this, the differences or errors are suppressed within 12% or below despite that there is an unknown value. In conclusion from this result, it is possible to effect the simulation even in a case where sample data contains unknown value, with almost equivalent accuracy to the case where the sample data does not contain any unknown value.

Next, a second experiment will be described. This experiment relates to toner-fixing strength analysis data for copiers. Specifically, in order to verify the validity of the learning algorithm, the experiment were carried out in the following manner: A target network system was made to learn toner-fixing strength analysis data without any unknown value and toner-fixing strength analysis data with an unknown value. After the learning, other toner-fixing strength analysis data than those used for the education was inputted as verification data so as to let the network system produce its output value, which was compared with the teacher data for verification to calculate the difference or error.

The toner-fixing strength analysis data is composed of nine inputs and one output as shown in a table of FIG. 15. A first input i1 is the glass transition point Tg [°C.] at which the material starts to move. A second input i2 is the melt-index MI [g/10 min.] which indicates how much of toner is melted in 10 minutes at 150 [° C.].

A third input i3 is MwL, a peak molecular weight of the low-molecular weight component; a fourth input i4 is MwH, a peak molecular weight of the high-molecular weight component; and a fifth input i5 is L/H [%], a high-molecular weight molecule ratio, that is, a peak blending ratio at which the high-molecular weight component and the low-molecular weight component are blended to produce toner.

A sixth input i6 is the dynamic storage modulus G' [$dyn/cm^2$]; a seventh input i7 is the dynamic loss modulus G" [$dyn/cm^2$]; and an eighth input i8 is the viscosity η [poise]. The dynamic storage modulus G' represents the extent to which toner on the paper recovers after having been crushed by the pressure of fixing rollers. The viscosity η represents the degree in which toner is crushed by the roller pressure; if a substance gains 100% recovery, it is a perfect elastic body. When the toner cannot gain 100% recovery, the difference of the degree of recovery from the perfectness is represented by the dynamic loss modulus G".

A ninth input i9 or acrylic ratio Ac/St [%] is a material component ratio between acrylics and styrene acryl copolymer, or represents the part of acrylics contained to the part of styrene acryl copolymer.

An output o1 indicates the fixed strength. That is, the strength of fixing between toner particles and between toner and the paper after toner on the surface of the paper was fused and softened by the heat and pressure while the paper with a toner image formed thereon being passed through the fixing unit.

The sample data is toner-fixing strength analysis data consisting the above-discussed nine input and one output. A learning data set (a) shown in FIG. 16 consists of eight patterns with no unknown value. Another learning data set (b) shown in FIG. 17 is that consisting of eight patterns with three unknown values. A verification data set (k) shown in FIG. 18 consists of six patterns.

FIG. 19 shows a verified result obtained from the network system educated by the data set (a); and FIG. 20 shows a verified result obtained from the network system educated by the data set (b). As the square errors of the two data sets are compared, it is understood that the error of the data set (b) is greater but both the results of sets (a) and (b) are not far different from the teacher data for verification. Thus, it was confirmed that in the case of the toner experiment, the simulation using toothless data can be effected properly, with almost equivalent accuracy to the case where the data without toothlessness is used.

Next, a third experiment will be described. This experiment is effected by educating the network system using four learning data sets consisting of thirteen patterns, eight patterns as in the learning data set of the second experiment and five added patterns. Then, similarly to the second experiment, errors of the output result from teacher data for verification are determined. This experiment is to examine whether even the addition of data set with unknown values are effective, or whether the accuracy of the simulation is improved or can be kept at the same level as compared to the result of the second experiment.

Sample data is similar toner-fixing strength analysis data of nine-input and one output, to those used in the second experiment. FIG. 21 shows a learning data set (c), which consists of thirteen patterns all free from unknown values. This data set is produced by adding new five patterns to the data set shown in FIG. 16.

FIG. 22 shows a learning data set (d), which consists of thirteen patterns wherein there are three unknown values. This data set is produced by adding new five patterns without unknown values, to the data set shown in FIG. 17.

FIG. 23 shows a learning data set (e), which consists of thirteen patterns wherein there are five unknown values. This data set is produced by adding new five patterns with five unknown values, to the data set shown in FIG. 16.

FIG. 24 shows a learning data set (f), which consists of thirteen patterns wherein there are eight unknown values. This data set is produced by adding new five patterns with five unknown values, to the data set shown in FIG. 17.

FIGS. 25 through 28 show output results as to data set for verification. FIG. 25 shows a verified result obtained from the network system educated by the learning data set (c); FIG. 26 shows a verified result obtained from the network system educated by the learning data set (d); FIG. 27 shows a verified result obtained from the network system educated by the learning data set (e); and FIG. 28 shows a verified result obtained from the network system educated by the learning data set (f).

As the square errors of the data sets (c) through (f) are remarked, there is not so large difference between errors from the educated system by the data with unknown values and from the educated system by the data with no unknown value. Still more, it is known that the square error is reduced as compared to that in the second experiment. As a result, it can be concluded that if the system is educated by an increased number of learning data sets, it is possible to improve the accuracy of the simulation even if the data sets contains unknown values. The result of this experiment also supports the validity of the invention.

Next, an application example of the fuzzy-neural network system of the invention will be described. A first example is application to a home-use electric product using sensors. As to air conditioners, for example, there are some conventional air conditioners which use fuzzy technologies or neuro-systems. In these air conditioners, outputs from sensors are used as the input values to the fuzzy control or the neuro system, in order to produce controlling outputs. These conventional systems, however, have drawbacks that if some of input values are not given due to the deficiency of sensors or any other defects, the calculation cannot be carried out properly and erroneous controlling outputs could be produced.

An air conditioner having the fuzzy-neural network system of the invention is able to avoid the above situation, because the algorithm of the system is constructed so that if some of the input values are unknown, the controlling outputs can be produced by using for example, the average of the estimated maximum and minimum of the unknown values.

Examples of input variables to the fuzzy-neural network system of the invention, applied to the air conditioner include the temperature, humidity, the variation of the room temperature and the like. Of these input variables, if an output from a sensor becomes unusable, due to, for example, the breakdown of a humidity sensor, the appliance activates a warning lamp which indicates the damage to the sensor and requests the user of the air condition to call a repair person.

Even in such a situation that the warning lamp is turned on, the air conditioner with the fuzzy-neural network system of the invention will not deactivate the operation or malfunction, but calculates the controlling output or execute re-study based on the other input parameters, to thereby make it possible to continue to operate without any inconvenience until arrival of the repair person. As a result, it is possible to reduce the time of disability of the appliance due to the breakdown, whereby it is possible to avoid causing the user to be frustrated too much.

The present invention can also be applied to other kinds of home-use electric appliances using sensors. Specifically, the invention can be applied to various fuzzy neural control home-use electric appliances using a plurality of sensors, such as a microwave range equipped with a temperature sensor, humidity sensor, weight sensor etc., or a washing machine with a weight sensor, photosensor, water-temperature sensor etc.

Next, an applied example of the system of the invention to the diagnosis will be described. When a doctor diagnoses the disease of a patient, the doctor makes various examinations and tests. In this example, expert knowledge of doctors is used for initial values for the fuzzy-neural network system of the invention, as fuzzy rules. Then, the fuzzy-neural network system is trained by diagnosis data. When a doctor should make various examinations in diagnosing the disease of a patient, some of necessary examinations could not be made due to a lack of testing devices in the hospital or any other reasons. Even in such a case, the system of the invention makes it possible for the doctor to predict a diagnosis by inputting the obtained test results into the fuzzy-neural network system of the invention.

Applications of the invention to various analyzers will be described next. In analyzing various experimental results, it is impossible, in general, to make an analysis if some of experimental items required are not obtained. The fuzzy-neural network system of the invention can be applied to such a case. That is, if the system of the invention is previously educated by the experimental results of complete data sets of the experimental items and incomplete data sets in which some of experimental items are lacked, the system is able to analyze an experimental result in which some of experimental data is lacked due to the default of experiments.

In the prior art system, it is impossible to produce output values if all the input parameters are not known. In accordance with the fuzzy-neural network system of the invention, it becomes possible to calculate output values even when some of input parameters are unknown.

In the conventional system, since an input parameter is treated as a single value, it is impossible to process the input parameter if it is unknown. In accordance with the fuzzy-neural network system of the invention, an input parameter is divided into two values, or the maximum and minimum values, whereby it is possible to represent an unknown input as two values indicating a known range. As a result, it becomes possible to calculate output values even when some of input parameters are unknown.

The prior art system is operated by effecting operative calculations using all the weights set up for connections in the configurated network. In accordance with the fuzzy-neural network system of the invention, the network is constructed so that unknown input parameters are represented using probable minimum and maximum values and substitute output values from the membership layer can be set up while the calculations to be made from the input layer to the network to the membership layers can be omitted. As a result, it is possible to reduce the amount of calculations.

The prior art system is operated by effecting operative calculations using all the weights set up for connections in the configurated network. In accordance with the fuzzy-neural network system of the invention, the network is constructed so that weights of rules can be selectively used in the calculations from the rule layer to the output layer in the network and output values from unrelated rules or insignificant weights are neglected. As a result, it is possible to simplify the operations from the rule layer to the output layer and therefore reduce the amount of calculations thereof.

In the learning process of the prior art network, all the connections between units are modified by adjusting weights based on learning. In accordance with the learning method of the fuzzy-neural network system of the invention, since the network itself has a significant structure, some of weights which need not be modified are left as it is or modified by a smaller amount than usual, depending upon the status of input data. This configuration enables simplification of the operations at the learning mode and reduction of the amount of calculations thereof, whereby it is possible to reduce the learning time.

In the prior art network, it is impossible to use data sets containing unknown values. In accordance with the learning method of the fuzzy-neural network system of the invention, it is possible to educate the system using leaning data sets in which some of incomplete data sets containing unknown values are included. Still more, it is possible to effect the simulation with improved accuracy by adding such incomplete data sets, as compared to the case where the incomplete data sets are not used.

What is claimed is:

1. A fuzzy-neural network system comprising:

an input layer receiving at least some input values and outputting values of input parameters;

a membership layer wherein a plurality of regions for each of said input parameters are formed by dividing the probable range of the input parameter and a membership function is defined for each of said regions, said membership layer producing membership values as to said regions for each of said input parameters, in accordance with the output values from said input layer;

a rule layer wherein specific rules are formed between regions belonging to different input parameters, said rule layer outputting a suitability for each of said rules;

an outputting layer producing an output parameter or parameters in accordance with output values from said rule layer; and a membership value setup means which, if some of said at least some input values are unknown values, sets up prescribed values as membership values corresponding to said unknown values.

2. A fuzzy-neural network system according to claim 1 wherein when some of said input parameters inputted to said input layer are unknown, each output from said membership layers are assumed as a range data represented by maximum and minimum values of the range, and the maximum of the range is taken as the maximum of an output from each membership function for one of all the input parameters while the minimum of the range is taken as the minimum value of the output from the membership function for the same input parameter.

3. A fuzzy-neural network system according to claim 2 wherein said maximum and minimum values for each of said unknown values are 1.0 and 0.0, respectively.

4. A fuzzy neural network system according to claim 2 wherein the maximum and minimum values of the output from the output layer is determined by the steps of: calculating a weighted average of output values outputted from each of rules between known input parameters in said rule layer and weighted by corresponding connection weights between said rule layers and said output layers; and re-calculating a weighted average by involving connection weights between each of rules containing unknown input parameters in said rule layer and said output layer.

5. A fuzzy neural network system according to claim 4 wherein the maximum and minimum values of the output from the output layer is determined by the steps of: calculating a weighted average of output values outputted from each of rules between known input parameters in said rule layer and weighted by corresponding connection weights between said output layers; extracting a maximum or minimum value of connection weights which are for said specified rules containing unknown input parameters and greater or smaller than the current weighted average; renewing said weighted average by involving the extracted maximum or minimum value; repeating the renewal of the weighted average until the weighed average no more increases or decreases by further involvement of the extracted weights; and determining the final weighted average as the maximum or minimum of said output layer, at the time the weighted average no more increases or decreases by any involvement of weights.

6. In a fuzzy-neural network system comprising;
   an input layer receiving at least some input values and outputting values of input parameters;
   a membership layer wherein a plurality of regions for each of said input parameters are formed by dividing the probable range of the input parameter and a membership function is defined for each of said regions, said membership layer producing membership values as to said regions for each of said input parameters, in accordance with output values from said input layer;
   a rule layer wherein specific rules are formed between regions belonging to different input parameters, said rule layer outputting a suitability for each of said rules;
   an outputting layer producing an output parameter or parameters in accordance with the output values from said rule layer; and
   a membership value setup means which, if some of said at least some input values are unknown values, sets up prescribed values as membership values corresponding to said unknown parameters values:
   a learning method characterized in that depending upon whether said input parameters relating to weights to be modified at a learning mode are known or not, one of different learning procedures is selectively used.

7. A learning method used in a fuzzy-neural network system according to claim 6 wherein when weights from said rule layer to said output layer are modified, weights for said prescribed rules between known input parameters are modified by using both the maximum and minimum of the output from said rule layer and weights for said prescribed rules involving unknown input parameters are modified by using one of the maximum and minimum from the output from said rule layer.

8. A learning method used in a fuzzy-neural network system according to claim 6 wherein when weights for constructing membership functions for all the input parameters from said input layer to said membership layer are modified, the modification of weights are carried out by adjusting only the weight for constructing membership functions for known input parameters.

* * * * *